(12) United States Patent
Sato et al.

(10) Patent No.: US 6,574,092 B2
(45) Date of Patent: Jun. 3, 2003

(54) CARBONACEOUS MATERIAL, POLARIZABLE ELECTRODE FOR ELECTRICAL DOUBLE-LAYER CAPACITOR, AND ELECTRICAL DOUBLE-LAYER CAPACITOR

(75) Inventors: Takaya Sato, Chiba (JP); Hiroshi Yoshida, Chiba (JP); Hideto Mitsuhashi, Chiba (JP); Shigenori Minamiru, Chiba (JP); Zenzo Hashimoto, Tokyo (JP); Tatsuo Shimizu, Tokyo (JP)

(73) Assignees: Nisshinbo Industries, Inc., Tokyo (JP); Itochu Corporation, Osaka (JP)

( * ) Notice: Subject to any disclaimer, the term of this patent is extended or adjusted under 35 U.S.C. 154(b) by 0 days.

(21) Appl. No.: 09/977,361

(22) Filed: Oct. 16, 2001

(65) Prior Publication Data

US 2002/0126439 A1 Sep. 12, 2002

(30) Foreign Application Priority Data

Oct. 16, 2000 (JP) ......................... 2000-315563

(51) Int. Cl.$^7$ ................................. H01G 9/00
(52) U.S. Cl. .................. 361/502; 361/503; 361/504; 361/505; 361/523; 29/25.03
(58) Field of Search .................. 361/582, 503, 361/508, 523, 528, 512, 516, 509, 511, 504, 505, 303, 305, 327–330; 29/25.03

(56) References Cited

U.S. PATENT DOCUMENTS

| 5,136,473 | A | * | 8/1992 | Tsuchiya et al. ............ 361/502 |
| 5,172,307 | A | * | 12/1992 | Tabuchi et al. |
| 5,956,225 | A | * | 9/1999 | Okuyama et al. ............ 361/502 |
| 6,031,712 | A | * | 2/2000 | Kurihara et al. ............ 361/502 |
| 6,038,123 | A | * | 3/2000 | Shimodaira et al. |
| 6,118,650 | A | * | 9/2000 | Maeda et al. ................ 361/508 |
| 6,205,016 | B1 | * | 3/2001 | Niu ............................ 361/503 |
| 6,288,888 | B1 | * | 9/2001 | Sakata et al. ............... 361/502 |
| 6,327,136 | B1 | * | 12/2001 | Meguro et al. |
| 6,335,857 | B1 | * | 1/2002 | Takimoto et al. ........... 361/502 |

FOREIGN PATENT DOCUMENTS

| EP | 1 049 116 A1 | 11/2000 |
| JP | A9-275042 | 10/1997 |
| JP | A10-287412 | 10/1998 |
| JP | A11-11921 | 1/1999 |

* cited by examiner

*Primary Examiner*—Dean A. Reichard
*Assistant Examiner*—Nguyen Ha
(74) *Attorney, Agent, or Firm*—Birch, Stewart, Kolasch & Birch, LLP

(57) ABSTRACT

A carbonaceous material having a pore size distribution, as determined from a nitrogen adsorption isotherm, in which pores with a radius of up to 10 Å account for at most 70% of the total pore volume, and having a specific surface area, as measured by the nitrogen adsorption BET method, of 1–500 m$^2$/g is optimized for the penetration of non-aqueous electrolyte solution to the interior thereof and the surface adsorption of ionic molecules so as to form an electrical double layer thereon. Electrical double-layer capacitors assembled using polarizable electrodes made with the carbonaceous material have a high voltage, a high energy density, a high capacitance, a long cycle life, and are amenable to miniaturization.

16 Claims, 3 Drawing Sheets

CARBONACEOUS MATERIAL, POLARIZABLE ELECTRODE FOR ELECTRICAL DOUBLE-LAYER CAPACITOR, AND ELECTRICAL DOUBLE-LAYER CAPACITOR

BACKGROUND OF THE INVENTION

1. Field of the Invention

The present invention relates to carbonaceous materials, polarizable electrodes for electrical double-layer capacitors, and electrical double-layer capacitors.

2. Prior Art

Electrical double-layer capacitors which can be charged and discharged at a large current hold considerable promise as energy storage devices for such applications as electrical cars, auxiliary power supplies and off-peak power storage. Such electrical double-layer capacitors can be more rapidly charged and discharged, and have a longer cycle life and a higher voltage durability, than lithium ion secondary cells, which have also drawn much attention lately as promising energy storage devices. On the other hand, they have a lower energy density and withstand voltage than lithium ion secondary cells. A strong need is thus felt for the development of electrical double-layer capacitors which, in addition to being capable of rapid charge and discharge and having a high durability, also have a high energy density and a high withstand voltage.

The energy stored in an electrical double-layer capacitor cell is computed as $\frac{1}{2}CV^2$ (C being the capacitance in farads (F) per cell, and V being the voltage that can be applied). Because the energy is proportional to the square of the voltage V applied, increasing the voltage that can be applied to the capacitor (withstand voltage) is an effective way to improve energy density. However, at a high voltage, the electrolyte solution decomposes, causing an increase in the internal resistance and a rapid decline in capacitance.

The polarizable electrodes used in electrical double-layer capacitors are in themselves electrochemically inert and are generally made with an activated carbon material having a large specific surface area; that is, about 1000 to 2500 $m^2/g$. Electrodes manufacturing with an activated carbon having a large specific surface area achieve a high capacitance per unit mass of the activated carbon. However, the activated carbon has more void areas, lowering the electrode density and resulting in a lower capacitance per unit volume of activated carbon in the electrode.

Finely divided activated carbon contains numerous pores which are classified according to size as macropores (pore radius, greater than 250 Å), mesopores (10 to 250 Å), and micropores (4 to 10 Å). This type of pore structure is believed to play a role in the large specific surface area of activated carbon.

It is also essential for the pores in finely divided activated carbon used in electrical double-layer capacitors to provide conditions suitable for approach by the electrolyte solution. Based on an investigation of the relationship between capacitance (F/cc) and the pore size distribution in activated carbon, JP-A 9-275042 discloses a good pore size distribution for activated carbon used in electrical double-layer capacitors to be one in which the most common pore size is from 10 to 20 Å, and especially 13±2 Å.

Other efforts have focused instead on the size of the cations and anions to be adsorbed by seeking activated carbons with optimal pore sizes for this purpose and developing high-capacitance electrical double-layer capacitors using such activated carbons. For example, given that the sulfate ions commonly used in capacitors which employ an aqueous electrolyte have a size of 3 Å, JP-A 10-287412 describes the use in electrical double-layer capacitor electrodes of a solid activated carbon having a pore diameter within a range of 3 to 15 Å, with the volume of pores up to 15 Å in diameter accounting for 65% of the total pore volume, and having a capacitance, as measured by the constant current discharge method at 30 $mA/cm^2$, of at least 20 F/cc.

The various ionic compounds commonly employed in electrical double-layer capacitors which use an aqueous electrolyte, such as hydrochloric acid, potassium chloride and sulfuric acid, have ion sizes of about 3 Å. On this basis, JP-A 11-11921 discloses a solid activated carbon with a pore diameter of 4.5 to 15 Å, which is 1.5 to 3.0 times the size of the largest ions in such electrolyte solutions.

However, unlike such electrical double-layer capacitors which use an aqueous electrolyte solution, in electrical double-layer capacitors which use a non-aqueous electrolyte solution, anion and cation movement and adsorption occur only in the presence of organic solvent molecules. It is thus essential (1) for the organic solvent molecules to fully penetrate to the interior of the activated carbon pores, and (2) for the cationic or anionic molecules to migrate through the organic solvent molecules and adsorb onto the activated carbon surface to form an electrical double layer. Thus, activated carbon used with non-aqueous electrolyte solutions must have a different pore size distribution than activated carbon used with aqueous electrolyte solutions.

For example, according to calculations based on the geometric structure of cyclic carbonate solvent molecules the distance from the hydrogen on the methyl group to the oxygen on the carbonyl group of propylene carbonate is about 8.6 Å. In butylene carbonate, this distance is about 10 Å. In solvent molecules having a chain-like structure, the distance between the ends of the molecule can be expected to be even larger. Moreover, although solvent molecules sometimes move individually, due to molecular interactions, they generally aggregate or form into clusters. It is thus common for such molecules to form into and move as masses larger than the calculated molecular diameter.

The smooth penetration of such gigantic solvent molecule aggregates into the activated carbon pores requires that the activated carbon contain many pores having a radius substantially larger than the solvent molecules.

Polarizable electrodes for electrical double-layer capacitors often have a potential with respect to lithium metal of about 3 V. This is because the activated carbon serving as a major component of the electrode has a potential with respect to lithium metal of about 3 V. For example, when a voltage of 4V is applied across a pair of positive and negative polarizable electrodes having a potential with respect to lithium metal of 3 V, the potential of the positive polarizable electrode with respect to lithium metal becomes 5 V and the potential of the negative polarizable electrode with respect to lithium metal becomes 1 V. The electrolyte solution thus undergoes decomposition at the positive electrode, which increases the internal resistance of the electrical double-layer capacitor and leads to a rapid decline in the capacitance.

Attempts have been made to overcome these problems by carefully studying the components (e.g., positive and negative electrodes, separator, electrolyte solution, housing) of electrical double-layer capacitors in which both the positive and negative electrodes are polarizable electrodes made primarily of activated carbon and which use a non-aqueous electrolyte solution, and trying to increase the withstand voltage per unit cell. However, the electrical double-layer capacitors achieved as a result of such efforts have a withstand voltage of about 2.5 to 3.3 V, which falls short of what is needed.

SUMMARY OF THE INVENTION

It is therefore an object of the present invention to provide a carbonaceous material which can be penetrated to the interior by a nonaqueous electrolyte solution, which has a pore size distribution optimized for the adsorption of ionic molecules onto the surface of the material and consequent formation of an electrical double layer, and which has a small specific surface area. Additional objects of the invention include providing a polarizable electrode for electric double-layer capacitors which is made using such a carbonaceous material, and a high-performance electrical double-layer capacitor endowed with a high capacitance.

As a result of extensive studies on electrical double-layer capacitors which use non-aqueous electrolyte solutions, and especially organic electrolyte solutions, as well as the relationship between the size of electrolyte solution molecules, the pore size distribution of the carbonaceous material, and the capacitance, we have found that using a carbonaceous material having a pore size distribution, as determined from a nitrogen adsorption isotherm, in which pores with a radius of up to 10 Å account for at most 70% of the total pore volume (that is, a carbonaceous material having many relatively large pores with a pore radius of more than 10 Å, and especially 15 to 500 Å, which allow the penetration of non-aqueous electrolyte solution molecules and are suitable for ionic molecule adsorption) allows the organic electrolyte solution molecules to penetrate smoothly to the interior of the pores, and enables the ionic molecules to adsorb to the surface of the carbonaceous material so as to form an electrical double layer. We also discovered that the use of a carbonaceous material having such a pore size distribution enables the specific surface area to be reduced to only 1 to 500 m²/g, and that the use of such a carbonaceous material in polarizable electrodes for electrical double-layer capacitors maximizes the electrode density, making it possible to achieve high-performance electrical double-layer capacitors endowed with an unprecedentedly high capacitance per unit volume.

Accordingly, in a first aspect, the invention provides a carbonaceous material having a pore size distribution, as determined from a nitrogen adsorption isotherm, in which pores with a radius of up to 10 Å account for at most 70% of the total pore volume.

In a second aspect, the invention provides a carbonaceous material having a pore size distribution, as determined from a nitrogen adsorption isotherm, in which pores with a radius of up to 10 Å account for at most 70% of the total pore volume, and having a specific surface area, as measured by the nitrogen adsorption BET method, of 1 to 500 m²/g.

Preferably, the carbonaceous materials of the first and second aspects of the invention have a pore size distribution, as determined from a nitrogen adsorption isotherm, in which at least 50% of the pores with a radius greater than 10 Å have a pore radius of 20 to 400 Å.

The carbonaceous materials of the invention are typically prepared by subjecting a mesophase pitch-based carbon material, a polyacrylonitrile-based carbon material, a gas phase-grown carbon material, a rayon-based carbon material or a pitch-based carbon material to alkali activation with an alkali metal compound, then grinding the activated carbon material.

It is preferable for the carbonaceous materials to be in the form of fine particles having a cumulative average particle size after grinding of at most 20 μm. It is especially preferable for the carbonaceous materials to be prepared by subjecting mesophase pitch-type carbon fibers to alkali activation, then grinding the activated fibers, and to be in the form of fine particles having a cumulative average particle size of at most 5 μm.

In a third aspect, the invention provides a polarizable electrode for electrical double-layer capacitors that is made by coating a current collector with an electrode composition containing a carbonaceous material according to the first or second aspect of the invention and a polymer binder, drying the applied coat, and press-forming; which polarizable electrode has a density after drying of 0.6 to 1.2 g/cm³.

In a fourth aspect, the invention provides a polarizable electrode for electrical double-layer capacitors that is made by coating a current collector with an electrode composition containing a carbonaceous material according to the first or second aspect of the invention, a polymer binder and a conductive material, drying the applied coat, and press-forming; which polarizable electrode has a density after drying of 0.6 to 1.2 g/cm³.

The polarizable electrode of the third and fourth aspects of the invention preferably has a spontaneous potential with respect to lithium metal of at most 3.0 V.

The polymer binder in the polarizable electrode of the third and fourth aspects of the invention is preferably a polymeric material having an interpenetrating network structure or a semi-interpenetrating network structure, a fluoropolymer material, or a thermoplastic polyurethane-type polymeric material.

The polarizable electrode is typically activated by carrying out at least one charge/discharge cycle at a potential at least 30% higher than the rated potential.

In a fifth aspect, the invention provides an electrical double-layer capacitor having a pair of polarizable electrodes, a separator between the polarizable electrodes, and an electrolyte solution; wherein one or both of the pair of polarizable electrodes is a polarizable electrode according to the above-described third or fourth aspect of the invention. The electrolyte solution is preferably a non-aqueous electrolyte solution.

The electrical double-layer capacitor typically has a capacitance $F_1$ at a high current of 90 mA/cm² and a capacitance $F_2$ at a low current of 1.8 mA/cm², as measured by a constant current discharge method, such that the ratio $F_2/F_1$ is from 1 to 4.

In a sixth aspect, the invention provides an electrical double-layer capacitor having a pair of polarizable electrodes, a separator between the polarizable electrodes, and an electrolyte solution; wherein the pair of polarizable electrodes are polarizable electrodes according to the above-described third or fourth aspect of the invention, and are activated by carrying out at least one charge/discharge cycle at a potential at least 30% higher than the rated potential.

The invention as set forth above and described more fully below provides a carbonaceous material which has a small specific surface area and a pore size distribution that allows a non-aqueous electrolyte to fully penetrate to the interior thereof, and which is thus optimized for the surface adsorption of ionic molecules and the formation thereon of an electrical double layer. Electrical double-layer capacitors assembled using polarizable electrodes made with the carbonaceous material have outstanding performance characteristics, including a high voltage, a high energy density, a high capacitance and a long cycle life, in addition to which they are amenable to miniaturization. These qualities make them highly suitable for use in a broad range of applications, including backup power supplies for various types of electrical and electronic equipment such as personal computers and mobile phones, and power regeneration and storage in transport devices such as electric cars and hybrid cars.

BRIEF DESCRIPTION OF THE DRAWINGS

The objects, features and advantages of the invention will become more apparent from the following detailed description, taken in conjunction with the accompanying drawings.

DETAILED DESCRIPTION OF THE INVENTION

Figure 1:
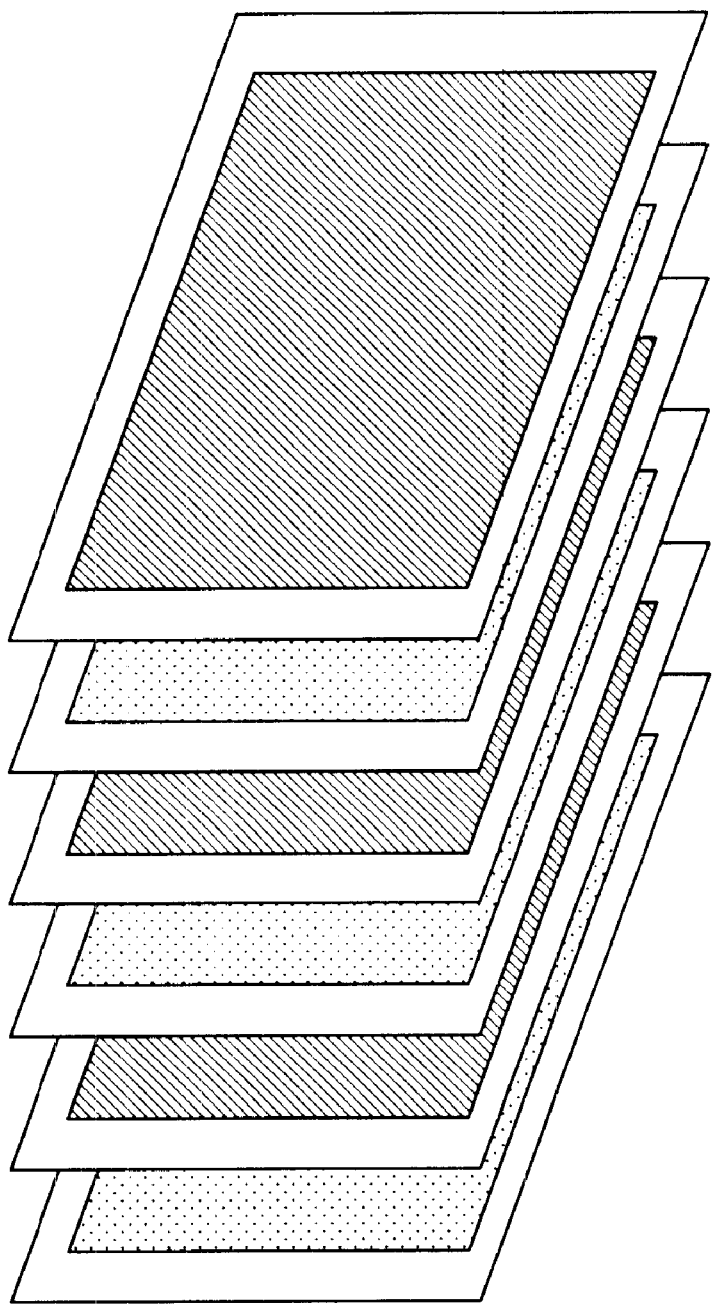
FIG. 1 is a perspective view of a stacked electrical double-layer capacitor.

The carbonaceous material of the invention is characterized by having a pore size distribution, as determined from a nitrogen adsorption isotherm, in which pores with a radius of up to 10 Å account for at most 70% of the total pore volume. This feature allows a carbonaceous material to be obtained which has a pore size distribution optimal for use with a non-aqueous electrolyte solution, and especially an organic electrolyte solution. The carbonaceous material allows an organic electrolyte to fully penetrate to the interior of the pores and, because it can efficiently adsorb on the surface thereof cations or anions to form an electrical double layer, is able to store a large amount of electrical energy.

The pore size distribution of the carbonaceous material, as determined from a nitrogen adsorption isotherm, is measured by the continuous flow method using nitrogen gas after vacuum outgassing the carbonaceous material. The volume (cc/g) of pores having a radius larger than 10 Å is computed from a desorption isotherm obtained by BJH pore size analysis from a pore distribution plot. The volume (cc/g) of pores with a radius up to 10 Å is computed from an adsorption isotherm obtained by the MP procedure from an MP plot.

In the carbonaceous material, the volume of pores having a radius up to 10 Å, as determined from a nitrogen adsorption isotherm, accounts for at most 70%, preferably up to 50%, more preferably up to 30%, and most preferably from 0 to 30%, of the total pore volume. If the volume of pores having a radius of up to 10 Å is too great, the overall pore volume of the carbonaceous material becomes too large and the capacitance per unit volume too small, making it impossible to achieve the desired objects and advantages of the invention.

The most common pore radius in the pore size distribution of the carbonaceous material of the invention, as determined from a nitrogen adsorption isotherm, is preferably 15 to 500 Å, more preferably 20 to 200 Å, and most preferably 50 to 120 Å. Moreover, in the carbonaceous material of the invention, preferably at least 50%, more preferably at least 60%, even more preferably at least 70%, and most preferably at least 80%, of the pores with a radius greater than 10 Å have a pore radius within a range of 20 to 400 Å. The proportion of pores with a radius greater than 10 Å which have a radius within a range of 20 to 400 Å may even be 100%.

In addition to satisfying the foregoing pore radius conditions, it is advantageous for the inventive carbonaceous material to have a specific surface area, as measured by the nitrogen adsorption BET method, of 1 to 500 $m^2/g$, preferably 20 to 300 $m^2/g$, more preferably 20 to 200 $m^2/g$, even more preferably 20 to 150 $m^2/g$, and most preferably 50 to 150 $m^2/g$. If the specific surface area of the carbonaceous material is too small, the surface area of the carbonaceous material on which the electrical double layer forms becomes smaller than desirable, resulting in a low capacitance. On the other hand, if the specific surface area is too large, the number of micropores and sub-micropores in the carbonaceous material which are unable to adsorb ionic molecules increases, in addition to which the electrode density decreases, and with it, the capacitance.

The specific surface area of the carbonaceous material of the invention can be held to a range of 1 to 500 $m^2/g$ by reducing the proportion of the total pore volume accounted for by the volume of pores having a radius of up to 10 Å, and thereby raising the proportion of relatively large pores having a radius of more than 10 Å, and especially 15 to 500 Å, which allow molecules of the non-aqueous electrolyte solution to fully penetrate to the interior and are suitable for ionic molecule adsorption. The use of such a carbonaceous material in electrical double-layer capacitor electrodes makes it possible to achieve a high capacitance per unit volume of the material.

The carbonaceous material of the invention is preferably a finely divided particulate material which has been prepared by subjecting a mesophase pitch-based carbon material, a polyacrylonitrile (PAN)-based carbon material, a gas phase-grown carbon material, a rayon-based carbon material or a pitch-based carbon;material to alkali activation with an alkali metal compound, then milling the activated carbon material. It is preferable, though not essential, for the mesophase pitch-based carbon material, PAN-based carbon material, gas phase-grown carbon material, rayon-based carbon material or pitch-based carbon material to be a fibrous carbonaceous material.

The carbonaceous material of the invention has a cumulative average particle size after milling of preferably at most 20 $\mu$m, more preferably at most 10 $\mu$m, even more preferably at most 5 $\mu$m, and most preferably 0.1 to 5 $\mu$m. It is especially advantageous for the carbonaceous material to be in the form of fine particles having a cumulative average particle size of up to 5 $\mu$m, and most preferably 0.1 to 5 $\mu$m, which have been formed by subjecting mesophase pitch-based carbon fibers to alkali activation, then milling the activated fibers.

"Cumulative average particle size," as used herein, refers to the particle size at the 50% point (median size) on the cumulative curve, based on a value of 100% for the total volume of the powder mass, when the particle size distribution of the finely divided carbonaceous material is determined.

Subjecting the carbonaceous material to alkali activation, followed by milling, allows the cumulative average particle size to be made even smaller. This makes it possible to closely pack the carbonaceous material into polarizable electrodes for electrical double-layer capacitors, and thereby raise the electrode density. Moreover, compared with fibrous carbonaceous materials, an electrode coating paste composed of the resulting material can be more readily applied to a current collector and press-formed to easily fabricate electrodes of uniform thickness.

The carbonaceous material of the invention can be produced from various starting materials. An example of a suitable method of production method from a pitch-type carbonaceous feedstock is described in steps (1) to (7) below.

(1) Starting Pitch

The starting pitch for pitch-based carbon fibers used in the practice of the invention may be produced from a variety of suitable starting materials, including petroleum and coal. Any type of pitch may be used as the feedstock, provided it is capable of being spun. However, a pitch having an optically anisotropic phase (mesophase) is preferable for achieving a high electrical conductivity. A pitch which contains absolutely no optically isotropic components measurable by polarizing microscopy, and is thus 100% composed of optically anisotropic phase (mesophase), is desirable because it has a uniform pitch structure which allows a uniform activation reaction to be carried out.

(2) Spinning

Any suitable known spinning method may be used, including melt spinning, centrifugal spinning and vortex spinning, although melt blow spinning is especially preferred. In mesophase pitch-based carbon fibers, the orientation of the graphite layer faces at the interior of the fibers is important. The degree of such orientation is controlled primarily by such factors as the pitch viscosity during spinning, and the spinning velocity, cooling speed and nozzle construction.

The forcible widening of the intervals between graphite layers by the alkali metal compound as it penetrates into the carbonaceous material is believed to be an important factor in alkali activation. To promote smoother activation, it is advantageous for the carbon fibers to have a structure in which graphite layer endfaces which readily admit the alkali metal compound are present at the fiber surface. The oriented structure of the graphite layer faces also most likely affects the yield of alkali activation. When these factors are weighed together with production cost considerations such as the construction and operating costs of spinning equipment and quality considerations such as control of the fiber diameter, use of a melt blow spinning process offers the most advantages overall. Melt blow spinning is particularly well suited to the production of a mat or felt-like carbon fiber web.

(3) Infusibilization

Mesophase pitch is a thermoplastic organic compound. In order to be able to carry out heat treatment (carbonization) while retaining its filamentary form, the spun pitch must first be subjected to infusibilizing treatment. Infusibilization may be carried out continuously in a liquid or gas phase by a conventional method, although it is generally carried out in an oxidizing atmosphere, such as air, oxygen or $NO_2$. For example, infusibilization in air is typically carried out at an average temperature rise rate of 1 to 15° C./min, and preferably 3 to 12° C./min, and within a treatment temperature range of about 100 to 350° C., and preferably about 150 to 300° C. Pitch fibers which are uniformly mixed with the alkali metal compound and heat-treated as spun, i.e., without first passing through such an infusibilizing step, re-melt in the heating step. This disrupts the orientation of the graphite layer faces formed in the spinning step and, in extreme cases, may even result in a loss of the filamentary shape.

(4) Carbonization

The infusibilized fiber prepared as described above may be used directly in the subsequent alkali activation step, although it is desirable to first subject it to carbonization treatment. The purpose of such treatment is to keep the large amount of low volatiles present in infusibilized fiber from lowering the yield of the alkali activation step, and to prevent contamination of the reaction system by tarry substances which volatize in the activation reaction. Carbonization treatment is thus desirable for the prior removal of such low volatiles. Carbonization is carried out in an inert gas such as nitrogen, typically at a treatment temperature of not more than 1000° C., and preferably from 350 to 800° C. A treatment temperature which is too high results in development of a graphite structure in the carbon fibers, causing the activation rate to slow excessively, so that the reaction takes too long. In addition, it increases the carbonization costs. On the other hand, too low a treatment temperature makes carbonization more difficult to carry out and may have an adverse impact on the yield of the activation step and the cost of treatment.

(5) Milling

If necessary, it may be advantageous to mill the resulting infusibilized fibers or carbonized fibers prior to alkali activation so as to enable uniform mixture with the alkali metal compound. Such milling typically yields particles having an average size of 10 to 30 μm.

Milling may be effectively carried out using, for example, a Victory mill, a jet mill or a high-speed rotary mill. Milling may also be carried out with a Henschel mixer, ball mill or automated mortar, although the pressurizing forces in such techniques act in the radial direction of the fibers, causing :frequent longitudinal splitting along the fiber axis, which lowers the efficiency and uniformity of activation. Moreover, milling by means of such techniques takes a long time, and thus is hardly appropriate for the purposes of the invention. A suitable way to carry out milling efficiently is to use a method in which the fibers are chopped by the high-speed rotation of a rotor having attached blades. The length of the chopped fibers can be controlled by adjusting, for example, the rotational speed of the rotor and the angle of the blades.

(6) Alkali Activation

Alkali metal compounds preferred for use in alkali activation include potassium hydroxide, potassium carbonate, potassium nitrite, potassium sulfate and potassium chloride. Of these, potassium hydroxide is especially preferred. Activation of the infusibilized fibers or the carbon fibers obtained by also carbonizing the infusibilized fibers as described above is typically carried out by uniformly mixing 1 part by weight of the milled infusibilized fibers or carbon fibers with 0.5 to 5 parts by weight, and preferably 1 to 4 parts by weight, of the alkali metal compound, followed by alkali activation at a temperature of 500 to 900° C., and preferably 600 to 800° C.

Too little alkali metal compound may adversely impact the efficiency of pore formation, whereas too much may result in only a small increase in the specific surface area of the carbonaceous material, which is inefficient. At an activation temperature of less than 500° C., the reaction may not readily proceed, whereas an activation temperature above 900° C. may result in such undesirable effects as deposition of alkali metal and corrosion of the reaction equipment. Alkali activation is preferably carried out within an inert gas such as nitrogen.

(7) Grinding

Following alkali activation of the carbonaceous material fibers, the reaction product is cooled to room temperature, after which unreacted alkali metal compound is removed by a suitable method such as rinsing with water. The reaction product is then ground into fine particles having a cumulative average particle size of preferably at most 20 $\mu$m, more preferably at most 10 $\mu$m, even most preferably 5 $\mu$m, and most preferably 0.1 to 5 $\mu$m, using a suitable apparatus such as a hammer mill, roll mill (compactor), multi-stage roll mill or air jet mill. The formation of a finely divided particulate material by such a grinding process provides a carbonaceous material which has the above-indicated pore size distribution as determined from a nitrogen adsorption isotherm and has the above-indicated BET specific surface area, and is thus especially preferred for use in polarizable.electrodes for electrical double-layer capacitors.

<Polarizable Electrodes for Electrical Double-Layer Capacitors of the Invention>

The polarizable electrodes for electrical double-layer capacitors of the invention are made by coating a current collector with an electrode composition containing a carbonaceous material and a polymer binder, drying the applied coat, and press-forming. The carbonaceous material used for this purpose is one according to the present invention, and the resulting polarizable electrode has a density after drying of 0.6 to 1.2 g/cm$^3$. In this way there can be obtained a polarizable electrode for electrical double-layer capacitors which has a large capacitance per unit volume of the carbonaceous material. If, instead, a carbonaceous material having a large specific surface area is used here as in the prior art, the electrode will have a large capacitance per unit mass of the carbonaceous material, but void areas in the carbonaceous material will increase, the electrode density will decrease, and the electrical double-layer capacitor will have a lower capacitance per unit volume of the carbonaceous material.

Hence, the electrode composition for electrical double-layer capacitors of the invention contains either a carbonaceous material and a polymer binder, or a carbonaceous material, a polymer binder and a conductive material. In either case, the carbonaceous material used is one according to the present invention.

The polymer binder is preferably (I) a polymeric material having an interpenetrating network structure or a semi-interpenetrating network structure, (II) a fluoropolymer material, or (III) a thermoplastic polyurethane-type polymeric material. With the use of (I) or III) as the polymer binder, the high adhesive properties enable the electrode composition to strongly adhere to the current collector and firmly hold together powder materials such as the carbonaceous material. The polymeric material with an interpenetrating network structure or a semi-interpenetrating network structure (I) has a high affinity with electrolyte solvent molecules and ionic molecules. Moreover, it provides a high ion mobility, can dissolve an ion-conductive salt to a high concentration, and has a high ionic conductivity. The fluoropolymer material (II) has an excellent thermal and electrical stability. Because it is thermoplastic, the polyurethane-type polymeric material (III) can be readily shaped. In addition, it suitably absorbs organic electrolyte solution and swells, and also has a high ionic conductivity. Moreover, it has an excellent elasticity that enables it to absorb fluctuations in electrode size associated with charging and discharging.

More specifically, the polymeric material with an interpenetrating network structure or a semi-interpenetrating network structure (I) may be composed of two or more compounds, such as polymers or reactive monomers, that are capable of forming a mutually interpenetrating network structure or semi-interpenetrating network structure.

Examples of the two or more compounds include:
(A) binder polymers formed by combining (a) a hydroxyalkyl polysaccharide derivative with (d) a crosslinkable functional group-bearing compound;
(B) binder polymers formed by combining (b) a polyvinyl alcohol derivative with (d) a crosslinkable functional-bearing compound; and
(C) binder polymers formed by combining (c) a polyglycidol derivative with (d) a crosslinkable functional group-bearing compound.

Any of the following may be used as the hydroxyalkyl polysaccharide derivative serving as component (a) of above binder polymer A:
(1) hydroxyethyl polysaccharides prepared by reacting ethylene oxide with a naturally occurring polysaccharide such as cellulose or starch,
(2) hydroxypropyl polysaccharides prepared by similarly reacting instead propylene oxide,
(3) dihydroxypropyl polysaccharides prepared by similarly reacting instead glycidol or 3-chloro-1,2-propanediol. Some or all of the hydroxyl groups on these hydroxyalkyl polysaccharides may be capped with an ester-bonded or ether-bonded substituent.

Illustrative examples of such polysaccharides include cellulose, starch, amylose, amylopectin, pullulan, curdlan, mannan., glucomannan, arabinan, chitin, chitosan, alginic acid, carrageenan and dextran. The polysaccharide is not subject to any particular limitations with regard to molecular weight, the presence or absence of a branched structure, the type and arrangement of constituent sugars in the polysaccharide and other characteristics. The use of cellulose or starch is especially preferred, in part because of their ready availability.

A method for synthesizing dihydroxypropyl cellulose is described in U.S. Pat. No. 4,096,326. Other dihydroxypropyl polysaccharides can be synthesized by known methods, such as those described by Sato et al. in *Makromol. Chem.* 193, p. 647 (1992) or in *Macromolecules* 24, p. 4691 (1991).

The hydroxyalkyl polysaccharide used in the invention has a molar degree of substitution of preferably at least 2. At a molar substitution below 2, the ability to dissolve ion-conductive metal salts becomes so low as to make use of the hydroxyalkyl polysaccharide impossible. The upper limit in the molar substitution is preferably 30, and more preferably 20. The industrial synthesis of hydroxyalkyl polysaccharides having a molar substitution greater than 30 can be difficult on account of production costs and the complexity of the synthesis operations. Moreover, even if one does go to the extra trouble of producing hydroxyalkyl polysaccharide having a molar substitution greater than 30, the increase in electrical conductivity resulting from the higher molar substitution is not likely to be very large.

The hydroxyalkyl polysaccharide derivative used as component (a) in the practice of the invention is one in which at least 10% of the terminal OH groups on the molecular chains of the above described hydroxyalkyl polysaccharide have been capped with one or more monovalent groups selected from among halogen atoms, substituted or unsubstituted monovalent hydrocarbon groups, $R^1CO-$ groups (wherein $R^1$ is a substituted or unsubstituted monovalent hydrocarbon group), $R^1{}_3Si-$ groups (wherein $R^1$ is the same as above), amino groups, alkylamino groups, $H(OR^2)_m-$ groups (wherein $R^2$ is an alkylene group of 2 to 4 carbons, and the letter m is an integer from 1 to 100), and phosphorus-containing groups.

The terminal OH groups may be capped using any known method for introducing the respective groups.

The hydroxyalkyl polysaccharide derivative serving as component (a) is typically included in an amount of 0.5 to 30 wt %, and preferably 1 to 20 wt %, based on the overall electrode composition for electrical double-layer capacitors.

Any of the following may be used as the crosslinkable functional group-bearing compound serving as component (d):

(1) an epoxy group-bearing compound in combination with a compound having two or more active hydrogens capable of reacting with the epoxy groups;
(2) an isocyanate group-bearing compound in combination with a compound having two or more active hydrogens capable of reacting with the isocyanate groups;
(3) a compound having two or more reactive double bonds.

Illustrative examples of the epoxy group-bearing compound (1) include compounds having two or more epoxy groups on the molecule, such as sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl) isocyanurate, glycerol polyglycidyl ether, trimethylpropane polyglycidyl ether, resorcinol diglycidyl ether, 1,6-hexanediol diglycidyl ether, ethylene glycol diglycidyl ether, propylene glycol diglycidyl ether, the diglycidyl ethers of ethylene-propylene glycol copolymers, polytetramethylene glycol diglycidyl ether and adipic acid diglycidyl ether.

A three-dimensional network structure can be formed by reacting the above epoxy group-bearing compound with a compound having at least two active hydrogens, such as an amine, alcohol, carboxylic acid or phenol. Illustrative examples of the latter compound include polymeric polyols such as polyethylene glycol, polypropylene glycol and ethylene glycol-propylene glycol copolymers, and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis(β-hydroxyethoxy)benzene, p-xylylenediol, phenyl diethanolamine, methyl diethanolamine and polyethyleneimine, as well as other polyfunctional amines, and polyfunctional carboxylic acids.

Illustrative examples of the isocyanate group-bearing compound (2) include compounds having two or more isocyanate groups, such as tolylene diisocyanate, xylylene diisocyanate, naphthylene diisocyanate, diphenylmethane diisocyanate, biphenylene diisocyanate, diphenyl ether diisocyanate, tolidine diisocyanate, hexamethylene diisocyanate and isophorone diisocyanate.

An isocyanato-terminal polyol prepared by reacting the above isocyanate compound with a polyol can also be used. Such compounds can be prepared by reacting an isocyanate such as diphenylmethane diisocyanate or tolylene diisocyanate with one of the polyols listed below.

In this case, the stoichiometric ratio between the isocyanate groups [NCO] on the isocyanate compound and the hydroxyl groups [OH] on the polyol compound is such as to satisfy the condition [NCO]>[OH]. The ratio [NCO]/[OH] is preferably in a range of 1.03/1 to 10/1, and especially 1.10/1 to 5/1.

Suitable examples of the polyol include polymeric polyols such as polyethylene glycol, polypropylene glycol and ethylene glycol-propylene glycol copolymers; and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis-(β-hydroxyethoxy)benzene, p-xylylenediol, phenyl diethanolamine, methyl diethanolamine and 3,9-bis(2-hydroxy-1,1-dimethyl)-2,4,8,10-tetraoxaspiro[5,5]-undecane.

Alternatively, instead of the polyol, an amine having two or more active hydrogens may be reacted with the isocyanate. The amine used may be one having a primary or a secondary amino group, although a primary amino group-bearing compound is preferred. Suitable examples include diamines such as ethylenediamine, 1,6-diaminohexane, 1,4-diaminobutane and piperazine; polyamines such as polyethyleneamine; and amino alcohols such as N-methyldiethanolamine and aminoethanol. Of these, diamines in which the functional groups have the same level of reactivity are especially preferred. Here again, the stoichiometric ratio between [NCO] groups on the isocyanate compound and [NH$_2$] and [NH] groups on the amine compound is such as to satisfy the condition [NCO]>[NH$_2$]+[NH].

The above isocyanate group-bearing compounds cannot by themselves form a three-dimensional network structure. However, a three-dimensional network structure can be formed by reacting the isocyanate group-bearing compound with a compound having at least two active hydrogens, such as amine, alcohol, carboxylic acid or phenol. Illustrative examples of such compounds having at least two active hydrogens include polymeric polyols such as polyethylene glycol, polypropylene glycol and ethylene glycol-propylene glycol copolymers, and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis(β-hydroxyethoxy)benzene, p-xylylenediol, phenyl diethanolamine, methyl diethanolamine and polyethyleneimine, as well as other polyfunctional amines, and polyfunctional carboxylic acids.

Illustrative examples of the above reactive double bond-bearing compound (3) which may be used as the crosslinkable functional group-bearing compound serving as component (d) include compounds containing two or more reactive double bonds, such as divinylbenzene, divinylsulfone, allyl methacrylate, ethylene glycol dimethacrylate, diethylene glycol dimethacrylate, triethylene glycol dimethacrylate, polyethylene glycol dimethacrylate (average molecular weight, 200 to 1,000), 1,3-butylene glycol dimethacrylate, 1,6-hexanediol dimethacrylate, neopentyl glycol dimethacrylate, polypropylene glycol dimethacrylate (average molecular weight, 400), 2-hydroxy-1,3-dimethacryloxypropane, 2,2-bis[4-(methacryloxyethoxy) phenyl]propane, 2,2-bis[4-(methacryloxyethoxy-diethoxy) phenyl]propane, 2,2-bis[4-(methacryloxyethoxy-polyethoxy)phenyl]propane, ethylene glycol diacrylate, diethylene glycol diacrylate, triethylene glycol diacrylate, polyethylene glycol diacrylate (average molecular weight, 200 to 1,000), 1,3-butylene glycol diacrylate, 1,6-hexanediol diacrylate, neopentyl glycol diacrylate, polypropylene glycol diacrylate (average molecular weight, 400), 2-hydroxy-1,3-diacryloxypropane, 2,2-bis[4-(acryloxyethoxy)phenyl] propane, 2,2-bis[4-(acryloxyethoxy-diethoxy)phenyl] propane, 2,2-bis[4-(acryloxyethoxy-polyethoxy)phenyl] propane, trimethylolpropane triacrylate, trimethylolpropane trimethacrylate, tetramethylolmethane triacrylate, tetramethylolmethane tetraacrylate, water-soluble urethane diacrylate, water-soluble urethane dimethacrylate, tricyclodecane dimethanol acrylate, hydrogenated dicyclopentadiene diacrylate, polyester diacrylate and polyester dimethacrylate.

If necessary, a compound containing an acrylic or methacrylic group may be added. Examples of such compounds include acrylates and methacrylates such as glycidyl methacrylate, glycidyl acrylate and tetrahydrofurfuryl methacrylate, as well as methacryloyl isocyanate, 2-hydroxymethylmethacrylic acid and N,N-dimethylaminoethylmethacrylic acid. Other reactive double bond-containing compounds may be,added as well, such as acrylamides (e.g., N-methylolacrylamide, methylenebisacrylamide, diacetoneacrylamide), and vinyl compounds such as vinyloxazolines and vinylene carbonate.

Here too, in order to form,a three-dimensional network structure, a compound having at least two reactive double bonds must be added. That is, a three-dimensional network structure cannot be formed with only compounds such as methyl methacrylate that have but a single reactive double bond. Some addition of a compound bearing at least two reactive double bonds is required.

Of the reactive double bond-bearing compounds described above, especially preferred reactive monomers include polyoxyalkylene component-bearing diesters of formula (1) below. The use of the latter in combination with a polyoxyalkylene component-bearing monoester of formula (2) below is recommended.

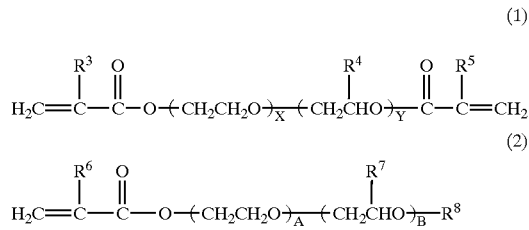

In formula (1), $R^3$, $R^4$ and $R^5$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and X and Y satisfy the condition $X \geq 1$ and $Y \geq 0$ or the condition $X \geq 0$ and $Y \geq 1$. The sum X+Y is preferably no higher than 100, and especially from 1 to 30. $R^3$, $R^4$ and $R^5$ are most preferably methyl, ethyl, n-propyl, i-propyl, n-butyl, i-butyl, s-butyl or t-butyl.

In formula (2), $R^6$, $R^7$ and $R^8$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and A and B satisfy the condition $A \geq 1$ and $B \geq 0$ or the condition $A \geq 0$ and $B \geq 1$. The sum A+B is preferably no higher than 100, and especially from 1 to 30. $R^6$, $R^7$ and $R^8$ are most preferably methyl, ethyl, n-propyl, i-propyl, n-butyl, i-butyl, s-butyl or t-butyl.

Typically, the polyoxyalkylene component-bearing diester and the polyoxyalkylene component-bearing monoester are heated or exposed to a suitable form of radiation, such as electron beams, microwaves or radio-frequency radiation, within the electrode composition, or a mixture of the two is heated, so as to form a three-dimensional network structure.

The three-dimensional network structure can generally be formed by reacting only the polyoxyalkylene component-bearing diester. However, as already noted, the addition of a polyoxyalkylene component-bearing monoester, which is a monofunctional monomer, to the polyoxyalkylene component-bearing diester is preferred because such addition introduces polyoxyalkylene branched chains into the three-dimensional network.

No particular limitation is imposed on the relative proportions of the polyoxyalkylene component-bearing diester and the polyoxyalkylene component-bearing monoester, although a weight ratio of polyoxyalkylene component-bearing diester to polyoxyalkylene component-bearing monoester within a range of 1 to 0.5, and especially 1 to 0.2, is preferred because this enhances film strength.

The crosslinkable functional group-bearing compound serving as component (d) is typically included in an amount of at least 1 wt %, and preferably 5 to 40 wt %, based on the overall electrode composition for electrical double-layer capacitors.

The electrode composition for electrical double-layer capacitors containing components (a) and (d), when heated or exposed to a suitable form of radiation, such as electron beams, microwaves or radio-frequency radiation, leads to the formation of a semi-interpenetrating polymer network structure in which molecular chains of a polymer composed of component (a) are interlocked with the three-dimensional network structure of a polymer formed by the reaction (polymerization) of the crosslinkable functional group-bearing compound serving as component (d).

In the polyvinyl alcohol derivative serving as component (b) of above binder polymer B, some or all of the hydroxyl groups on the polymeric compound having oxyalkylene chain-bearing polyvinyl alcohol units may be substituted. Here, "hydroxyl groups" refers collectively to remaining hydroxyl groups from the polyvinyl alcohol units and hydroxyl groups on the oxyalkylene-containing groups introduced onto the molecule.

The polymeric compound having polyvinyl alcohol units has an average degree of polymerization of at least 20, preferably at least 30, and most preferably at least 50. Some or all of the hydroxyl groups on the polyvinyl alcohol units are substituted with oxyalkylene-containing groups. The upper limit in the average degree of polymerization is preferably no higher than 2,000, and especially no higher than 200. The average degree of polymerization refers herein to the number-average degree of polymerization. Polymeric compounds with too high a degree of polymerization have an excessively high viscosity, making them difficult to handle. Accordingly, the range in the degree of polymerization is preferably from 20 to 500 monomeric units.

These polyvinyl alcohol units make up the backbone of the polyvinyl alcohol derivative and have the following general formula (3)

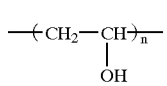

In formula (3), the letter n is at least 20, preferably at least 30, and most: preferably at least 50. The upper limit for n is preferably no higher than 2,000, and most preferably no higher than 200.

It is highly advantageous for the polyvinyl alcohol unit-containing polymeric compound to be a homopolymer which satisfies the above range in the average degree of polymerization and in which the fraction of polyvinyl alcohol units in the molecule is at least 98 mol %. However, use can also be made of, without particular limitation, polyvinyl alcohol unit-containing polymeric compounds which satisfy the above range in the average degree of polymerization and have a polyvinyl alcohol fraction of preferably at least 60 mol %, and more preferably at least 70 mol %. Illustrative examples include polyvinylformal in which some of the hydroxyl groups on the polyvinyl alcohol have been converted to formal, modified polyvinyl alcohols in which some of the hydroxyl groups on the polyvinyl alcohol have been alkylated, poly(ethylene vinyl alcohol), partially saponified polyvinyl acetate, and other modified polyvinyl alcohols.

Some or all of the hydroxyl groups on the polyvinyl alcohol units of the polymeric compound are substituted with oxyalkylene-containing groups (moreover, some of the hydrogen atoms on these oxyalkylene groups may be substituted with hydroxyl groups) to an average molar substitution of at least 0.3. The proportion of hydroxyl groups substituted with oxyalkylene-containing groups is preferably at least 30 mol %, and more preferably at least 50 mol %.

The average molar substitution (MS) can be determined by accurately measuring the weight of the polyvinyl alcohol charged and the weight of the reaction product. Let us consider, for example, a case in which 10 g of polyvinyl alcohol (PVA) is reacted with ethylene oxide, and the weight of the resulting PVA derivative is 15 g. The PVA units have the formula —(CH$_2$CH(OH))—, and so their unit molecular weight is 44. In the PVA derivative obtained as the reaction product, the —OH groups on the original —(CH$_2$CH(OH))— units have become —O—CH$_2$CH$_2$O)$_n$—H groups, and so the unit molecular weight of the reaction product is 44+44n. Because the increase in weight associated with the reaction is represented by 44n, the calculation is carried out as follows.

$$\frac{PVA}{PVA\ derivative} = \frac{44}{44+44n} = \frac{10\ g}{15\ g}$$

$$440 + 440n = 660$$

$$n = 0.5$$

Hence, the molar substitution in this example is 0.5. Of course, this value merely represents the average molar substitution and does not give any indication of, for example, the number of unreacted PVA units on the molecule or the length of the oxyethylene groups introduced onto the PVA by the reaction.

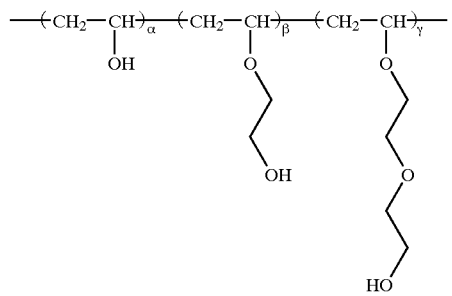

$$\alpha + \beta + \gamma = 1$$

Suitable methods for introducing oxyalkylene-containing groups onto the above polyvinyl alcohol unit-containing polymeric compound include (1) reacting the polyvinyl alcohol unit-containing polymeric compound with an oxirane compound such as ethylene oxide, and (2) reacting the polyvinyl alcohol unit-containing polymeric compound with a polyoxyalkylene compound having a hydroxy-reactive substituent at the end.

In above method (1), the oxirane compound may be any one or combination selected from among ethylene oxide, propylene oxide and glycidol.

If ethylene oxide is reacted in this case, oxyethylene chains are introduced onto the polymeric compound as shown in the following formula.

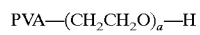

In the formula, the letter a is preferably from 1 to 10, and most preferably from 1 to 5.

If propylene oxide is reacted instead, oxypropylene chains are introduced onto the polymeric compound as shown below.

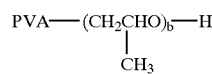

In the formula, the letter b is preferably from 1 to 10, and most preferably from 1 to 5.

And if glycidol is reacted, two branched chains (1) and (2) are introduced onto the compound, as shown below.

Reaction of a hydroxyl group on the PVA with glycidol can proceed in either of two ways: a attack or b attack. The reaction of one glycidol molecule creates two new hydroxyl groups, each of which can in turn react with glycidol. As a result, the two following branched chains (1) and (2) are introduced onto the hydroxyl groups of the PVA units.

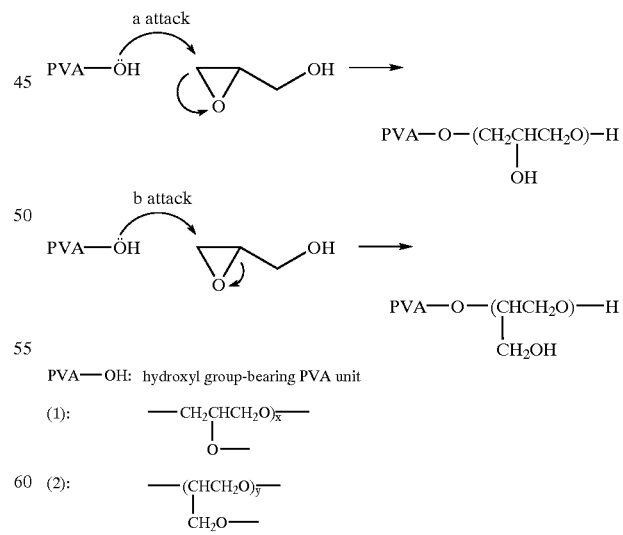

In branched chains (1) and (2), the value x+y is preferably from 1 to 10, and most preferably from 1 to 5. The ratio of x to y is not particularly specified, although x:y generally falls within a range of 0.4:0.6 to 0.6:0.4.

The reaction of the polyvinyl alcohol unit-containing polymeric compound with the above oxirane compound can be carried out using a basic catalyst such as sodium hydroxide, potassium hydroxide or any of various amine compounds.

The reaction of polyvinyl alcohol with glycidol is described for the purpose of illustration. First, the reaction vessel is charged with a solvent and polyvinyl alcohol. It is not essential in this case for the polyvinyl alcohol to dissolve in the solvent. That is, the polyvinyl alcohol may be present in the solvent either in a uniformly dissolved state or in a suspended state. A given amount of a basic catalyst, such as aqueous sodium hydroxide, is added and stirred for a while into the solution or suspension, following which glycidol diluted with a solvent is added. Reaction is carried out at a given temperature for a given length of time, after which the polyvinyl alcohol is removed. If the polyvinyl alcohol is present within the reaction mixture in undissolved form, it is separated off by filtration using a glass filter, for example. If, on the other hand, the polyvinyl alcohol is dissolved within the reaction mixture, it is precipitated out of solution by pouring an alcohol or other suitable precipitating agent into the reaction mixture, following which the precipitate is separated off using a glass filter or the like. The modified polyvinyl alcohol product is purified by dissolution in water, neutralization, and either passage through an ion-exchange resin or dialysis. The purified product is then freeze-dried, giving a dihydroxypropylated polyvinyl alcohol.

In the reaction, the molar ratio between the polyvinyl alcohol and the oxirane compound is preferably 1:10, and most preferably 1:20.

The polyoxyalkylene compound having a hydroxy-reactive substituent at the end used in above method (2) may be a compound of general formula (4) below

$$A—(R^9O)_m—R^{10} \quad (4)$$

In formula (4), the letter A represents a monovalent substituent having reactivity with hydroxyl groups. Illustrative examples include isocyanate groups, epoxy groups, carboxyl groups, carboxylic acid chloride groups, ester groups, amide groups, halogen atoms such as fluorine, bromine and chlorine, silicon-bearing reactive substituents, and other monovalent substituents capable of reacting with hydroxyl groups. Of these, isocyanate groups, epoxy groups, and carboxylic acid chloride groups are preferred on account of their reactivity.

The carboxyl group may also be an acid anhydride. Preferred ester groups are methyl ester and ethyl ester groups. Examples of suitable silicon-bearing reactive substituents include substituents having terminal SiH or SiOH groups.

The hydroxy-reactive group, such as isocyanate or epoxy, may be bonded directly to the oxyalkylene group $R^9O$ or through, for example, an intervening oxygen atom, sulfur atom, carbonyl group, carbonyloxy group, nitrogenous group (e.g., NH—, N(CH$_3$)—, N(C$_2$H$_5$)—) or SO$_2$ group. Preferably, the hydroxy-reactive group is bonded to the oxyalkylene group $R^9O$ through, for example, an alkylene, alkenylene or arylene group having 1 to 10 carbons, and especially 1 to 6 carbons.

Examples of polyoxyalkylene groups bearing this type of substituent A that may be used are the products obtained by reacting polyisocyanate compounds at the hydroxyl end group on a polyoxyalkylene group. Isocyanate group-bearing compounds that may be used in this case include compounds having two or more isocyanate groups on the molecule, such as tolylene diisocyanate, xylylene diisocyanate, naphthylene diisocyanate, diphenylmethane diisocyanate, biphenylene diisocyanate, diphenyl ether diisocyanate, tolidine diisocyanate, hexamethylene diisocyanate and isophorone diisocyanate. For example, use can be made of compounds such as may be obtained from the following reaction.

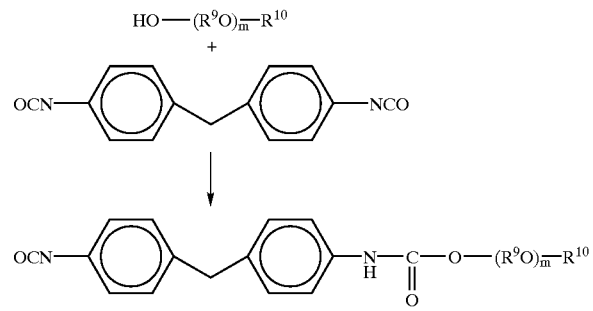

In the formula, $R^9O$ is an oxyalkylene group of 2 to 5 carbons, examples of which include —CH$_2$CH$_2$O—, —CH$_2$CH$_2$CH$_2$O—, —CH$_2$CH(CH$_3$)O—, —CH$_2$CH(CH$_2$CH$_3$)O— and —CH$_2$CH$_2$CH$_2$CH$_2$O—. The letter m represents the number of moles of the oxyalkylene group added. This number of added moles (m) is preferably from 1 to 100, and most preferably from 1 to 50.

Here, the polyoxyalkylene chain represented by the above formula $(R^9O)_m$ is most preferably a polyethylene glycol chain, a polypropylene glycol chain or a polyethylene oxide (EO)/polypropylene oxide (PO) copolymer chain. The weight-average molecular weight of these polyoxyalkylene chains is preferably from 100 to 3,000, and most preferably within the weight-average molecular weight range of 200 to 1,000 at which the compound is liquid at room temperature.

$R^{10}$ in the above formula is a capping moiety for one end of the chain. This represents a hydrogen atom, a substituted or unsubstituted monovalent hydrocarbon group having 1 to 10 carbons, or a $R^{11}CO—$ group (wherein $R^{11}$ is a substituted or unsubstituted monovalent hydrocarbon group having 1 to 10 carbons).

Illustrative examples of the substituted or unsubstituted monovalent hydrocarbon groups having 1 to 10 carbons that may be used as the capping moiety include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl and xylyl; aralkyl groups such as benzyl, phenylethyl and phenylpropyl; alkenyl groups such as vinyl, allyl, propenyl, isopropenyl, butenyl, hexenyl, cyclohexenyl and octenyl; and substituted groups in which some or all of the hydrogen atoms on the above groups have been substituted with halogen atoms such as fluorine, bromine or chlorine, cyano, hydroxyl, $H(OR^{12})_z—$ (wherein $R^{12}$ is an alkylene having 2 to 4 carbons, and z is an integer from 1 to 100), amino, aminoalkyl or phosphono. Specific examples of such substituted groups include cyanoethyl, cyanobenzyl, substituted groups in which cyano is bonded to other alkyl groups, chloromethyl, chloropropyl, bromoethyl and trifluoropropyl. These may be used alone or as combinations of two or more thereof. The monovalent hydrocarbon group preferably has from 1 to 8 carbons.

Illustrative examples of $R^{11}CO—$ groups that may be used as the capping moiety include those in which $R^{11}$ is a substituted or unsubstituted monovalent hydrocarbon group having 1 to 10 carbons. Preferred examples of $R^{11}$ include alkyl or phenyl groups which may be substituted with cyano, acyl groups, benzoyl groups and cyanobenzoyl groups.

The reaction in method (2) between the above-described polyvinyl alcohol unit-containing polymeric compound and the above-described polyoxyalkylene compound having a hydroxy-reactive substituent at the end may be carried out in the same manner as the reaction carried out with an oxirane compound in method (1).

In the reaction, the molar ratio between the polyvinyl alcohol and the polyoxyalkylene compound having a hydroxy-reactive substituent at the end is preferably from 1:1 to 1:20, and most preferably from 1:1 to 1:10.

The structure of the polymeric compound of the invention in which oxyalkylene-containing groups have been introduced onto polyvinyl alcohol units can be verified by $^{13}$C-NMR spectroscopy.

The extent to which the oxyalkylene chain-bearing polyvinyl alcohol unit-containing polymeric compound serving as component (b) of binder polymer B in the invention contains oxyalkylene groups can be determined in this case using various analytical techniques such as NMR or elemental analysis, although a method of determination based on the weight of the polymer charged as a reactant and the increase in weight of the polymer formed by the reaction is simple and convenient. For example, determination from the yield may be carried out by precisely measuring both the weight of the polyvinyl alcohol unit-containing polymeric compound charged into the reaction and the weight of the oxyalkylene group-bearing polyvinyl alcohol unit-containing polymeric compound obtained from the reaction, then using this difference to calculate the quantity of oxyalkylene chains that have been introduced onto the molecule (referred to hereinafter as the average molar substitution, or "MS").

The average molar substitution serves here as an indicator of the number of moles:of oxyalkylene groups that have been introduced onto the molecule per polyvinyl alcohol unit. In the polymeric compound of the invention, the average molar substitution must be at least 0.3, and is preferably at least 0.5, more preferably at least 0.7 and most preferably at least 1.0. No particular upper limit is imposed on the average molar substitution, although a value not higher than 20 is preferred. Too low an average molar substitution may result in a failure of the ion-conductive salt to dissolve, lower ion mobility and lower ionic conductivity. On the other hand, increasing the average molar substitution beyond a certain level fails to yield any further change in the solubility of the ion-conductive salt or ion mobility and is thus pointless.

Depending on its average degree of polymerization, the oxyalkylene chain-bearing polyvinyl alcohol unit-containing polymeric compound used as component (b) varies in appearance at room temperature (20° C.) from a highly viscous molasses-like liquid to a rubbery solid. The higher the average molecular weight, the more the compound, with its low fluidity at room temperature, qualifies as a solid (albeit a soft, paste-like solid).

Regardless of its average degree of polymerization, the polymeric compound serving as component (b) is not a linear polymer. Rather, due to the interlocking of its highly branched molecular chains, it is an amorphous polymer.

The polyvinyl alcohol derivative used as component (b) can be prepared by capping some or all of the hydroxyl groups on the molecule (these being the sum of the remaining hydroxyl groups from the polyvinyl alcohol units and the hydroxyl groups on the oxyalkylene-containing groups introduced onto the molecule), and preferably at least 10 mol %, with one or more monovalent substituents selected from among halogen atoms, substituted or unsubstituted monovalent hydrocarbon groups having 1 to 10 carbons, $R^{11}$CO— groups (wherein $R^{11}$ is a substituted or unsubstituted monovalent hydrocarbon group of 1 to 10 carbons), $R^{11}_3$Si— groups ($R^{11}$ being as defined above), amino groups, alkylamino groups and phosphorus-containing groups.

Capping may be carried out using known techniques for introducing various suitable substituents onto hydroxyl end groups.

The polyvinyl alcohol derivative serving as component (b) is typically included in an amount of 0.5 to 30 wt %, and preferably 1 to 20 wt %, based on the overall electrode composition for electrical double-layer capacitors.

Component (d) in binder polymer B may be the same as component (d) used in binder polymer A described above. The electrode composition for electrical double-layer capacitors containing components (b) and (d), when heated or exposed to a suitable form of radiation, such as electron beams, microwaves or radio-frequency radiation, leads to the formation of a semi-interpenetrating polymer network structure in which molecular chains of a polymer composed of component (b) are interlocked with the three-dimensional network structure of a polymer formed by the reaction (polymerization) of the crosslinkable functional group-bearing compound serving as component (d).

The polyglycidol derivative serving as component (c) of the earlier-described binder polymer C is a compound containing units of formula (5) (referred to hereinafter as "A units")

(5)

and units of formula (6) (referred to hereinafter as "B units")

(6)

in which compound the ends of the molecular chains are capped with specific substituents.

The polyglycidol can be prepared by polymerizing glycidol or 3-chloro-1,2-propanediol, although it is generally advisable to carry out polymerization using glycidol as the starting material.

Known processes for carrying out such a polymerization reaction include (1) processes involving the use of a basic catalyst such as sodium hydroxide, potassium hydroxide or any of various amine compounds; and (2) processes involving the use of a Lewis acid catalyst (see A. Dworak et al.: *Macromol. Chem. Phys.* 196, 1963–1970 (1995); and R. Toker: *Macromolecules* 27, 320–322 (1994)).

The total number of A and B units in the polyglycidol is preferably at least two, more preferably at least six, and most preferably at least ten. There is no particular upper limit, although a total number of such groups which does not exceed 10,000 is preferred. The total number of A and B units is preferably low in cases where the polyglycidol must have the flowability of a liquid, and is preferably high where a high viscosity is required.

The appearance of these A and B units is not regular, but random. Any combination is possible, including, for example, -A-A-A, -A-A-B-, -A-B-A-, -B-A-A-, -A-B-B-, -B-A-B-, -B-B-A- and -B-B-B-.

The polyglycidol has a polyethylene glycol equivalent weight-average molecular weight (Mw), as determined by gel permeation chromatography (GPC), within a range of preferably 200 to 730,000, more preferably 200 to 100,000, and most preferably 600 to 20,000. Polyglycidol having a weight-average molecular weight of up to about 2,000 is a highly viscous liquid that flows at room temperature, whereas polyglycidol with a weight-average molecular weight above 3,000 is a soft, paste-like solid at room temperature. The average molecular weight ratio (Mw/Mn) is preferably 1.1 to 20, and most preferably 1.1 to 10.

Depending on its molecular weight, the polyglycidol varies in appearance at room temperature (20° C.) from a highly viscous molasses-like liquid to a rubbery solid. The higher the molecular weight, the more the compound, with its low fluidity at room temperature, qualifies as a solid (albeit a soft, paste-like solid).

Regardless of how large or small its molecular weight, the polyglycidol is not a linear polymer. Rather, due to the interlocking of its highly branched molecular chains, it is an amorphous polymer. This is evident from the wide-angle x-ray diffraction pattern, which lacks any peaks indicative of the presence of crystals.

The ratio of A units to B units in the molecule is within a range of preferably 1/9 to 9/1, and especially 3/7 to 7/3.

Because the polyglycidol is colorless, transparent and nontoxic, it can be used in a broad range of applications, such as an electrochemical material, including a binder substance for various active materials (e.g., binders in electroluminescent devices), as a thickener, or as an alkylene glycol substitute.

In the practice of the invention, component (c) of binder polymer C is a polyglycidol derivative in which at least 10% of the terminal hydroxyl groups on the molecular chains of the above-described polyglycidol are capped with one or more type of monovalent group selected from among halogen atoms, substituted or unsubstituted monovalent hydrocarbon groups, $R^{11}CO-$ groups (wherein $R^{11}$ is a substituted or unsubstituted monovalent hydrocarbon group), $R^{11}_3Si-$ groups (wherein $R^{11}$ is as defined above), amino groups, alkylamino groups, $H(OR^{12})_m-$ groups (wherein $R^{12}$ is an alkylene group of 2 to 4 carbons, and m is an integer from 1 to 100) and phosphorus-containing groups.

Capping may be carried out using known techniques for introducing various suitable substituents onto hydroxyl end groups.

The polyglycidol derivative serving as component (c) is typically included in an amount of 0.5 to 30 wt %, and preferably 1 to 20 wt %, based on the overall electrode composition for electrical double-layer capacitors.

Component (d) in binder polymer C may be the same as component (d) used in binder polymer A described above. The electrode composition for electrical double-layer capacitors containing components (c) and (d), when heated or exposed to a suitable form of radiation, such as electron beams, microwaves or radio-frequency radiation, leads to the formation of a semi-interpenetrating polymer network structure in which molecular chains of a polymer composed of component (c) are interlocked with the three-dimensional network structure of a polymer formed by the reaction (polymerization) of the crosslinkable functional group-bearing compound serving as component (d).

Illustrative examples of fluoropolymer materials that may be used as the above-mentioned type (II) binder polymer include polyvinylidene fluoride (PVDF), vinylidene fluoride-hexafluoropropylene (HFP) copolymer (P(VDF-HFP)), vinylidene fluoride-chlorotrifluoroethylene (CTFE) copolymer (P(VDF-CTFE)), vinylidene fluoride-hexafluoropropylene fluororubber (P(VDF-HFP)), vinylidene fluoride-tetrafluoroethylene-hexafluoropropylene fluororubber (P(VDF-TFE-HFP)) and vinylidene fluoride-tetrafluoroethylene-perfluoro(alkyl vinyl ether) fluororubber. The fluoropolymer has a vinylidene fluoride content of preferably at least 50 wt %, and most preferably at least 70 wt %. The upper limit in the vinylidene fluoride content of the fluoropolymer is preferably about 97 wt %. Of the above fluoropolymers, the use of polyvinylidene fluoride (PVDF), copolymers of vinylidene fluoride and hexafluoropropylene (P(VDF-HFP)), and copolymers of vinylidene fluoride and chlorotrifluoroethylene (P(VDF-CTFE)) is preferred.

The fluoropolymer typically has a weight-average molecular weight of at least 500,000, preferably from 500,000 to 2,000,000, and most preferably from 500,000 to 1,500,000. Too low a weight-average molecular weight may result in an excessive decline in physical strength.

The fluoropolymer material is typically included in an amount of 0.5 to 30 wt %, and preferably 1 to 20 wt %, based on the overall electrode composition for electrical double-layer capacitors.

Thermoplastic polyurethane-type polymeric materials that may be used as the above-mentioned type (III) binder polymer are preferably thermoplastic polyurethane resins prepared by reacting (A) a polyol compound with (B) a polyisocyanate compound and (C) a chain extender. Suitable thermoplastic polyurethane resins include not only polyurethane resins having urethane linkages, but also polyurethane-urea resins having both urethane linkages and urea linkages.

The polyol compound serving as component (A) above is preferably one prepared by the dehydration or dealcoholation of any of compounds (i) to (vi) below, and most preferably a polyester polyol, a polyester polyether polyol, a polyester polycarbonate polyol, a polycaprolactone polyol, or a mixture thereof:

(i) polyester polyols prepared by the ring-opening polymerization of one or more cyclic ester (lactone);

(ii) polyester polyols prepared by reacting at least one of the above polyester polyols obtained by the ring-opening polymerization of a cyclic ester (lactone) with at least one carboxylic acid and at least one compound selected from the group consisting of dihydric aliphatic alcohols, carbonate compounds, polycarbonate polyols and polyether polyols;

(iii) polyester polyols prepared by reacting at least one carboxylic acid with at least one dihydric aliphatic alcohol;

(iv) polyester polycarbonate polyols prepared by reacting at least one carboxylic acid with at least one polycarbonate polyol;

(v) polyester polyether polyols prepared by reacting at least one carboxylic acid with at least one polyether polyol; and (vi) polyester polyols prepared by reacting at least one carboxylic acid with two or more compounds selected from the group consisting of dihydric aliphatic alcohols, polycarbonate polyols and polyether polyols.

Examples of suitable cyclic esters (lactones) include γ-butyrolactone, δ-valerolactone and ε-caprolactone.

Examples of suitable carboxylic acids include linear aliphatic dicarboxylic acids having 5 to 14 carbons, such as glutaric acid, adipic acid, pimelic acid, suberic acid, azelaic acid, sebacic acid and dodecan dicarboxylic acid; branched aliphatic dicarboxylic acids having 5 to 14 carbons, such as 2-methylsuccinic acid, 2-methyladipic acid, 3-methyladipic acid, 3-methylpentanedioic acid, 2-methyloctanedioic acid, 3,8-dimethyldecanedioic acid and 3,7-dimethyldecanedioic acid; aromatic dicarboxylic acids such as terephthalic acid, isophthalic acid and o-phthalic acid; and ester-forming derivatives thereof. Any one or combinations of two or more of the above may be used. Of these, linear or branched aliphatic dicarboxylic acids having 5 to 14 carbons are preferred. The use of adipic acid, azelaic acid or sebacic acid is especially preferred.

Examples of suitable divalent aliphatic alcohols include linear aliphatic diols of 2 to 14 carbons, such as ethylene glycol, 1,3-propanediol, 1,4-butanediol, 1,5-pentanediol, 1,6-hexanediol, 1,7-heptanediol, 1,8-octanediol, 1,9-nonanediol and 1,10-decanediol; branched aliphatic diols of 3 to 14 carbons, including 2-methyl-1,3-propanediol, neopentyl glycol, 3-methyl-1,5-pentanediol and 2-methyl-1,8-octanediol; and alicyclic diols such as cyclohexanedimethanol and cyclohexanediol. Any one or combinations of two or more of the above may be used. Of these, branched aliphatic diols of 4 to 10 carbons are preferred, and 3-methyl-1,5-pentanediol is especially preferred.

Examples of suitable carbonate compounds include dialkyl carbonates such as dimethyl carbonate and diethyl carbonate, alkylene carbonates such as ethylene carbonate, and diaryl carbonates such as diphenyl carbonate.

Suitable polycarbonate polyols include those prepared by a dealcoholation reaction between a polyhydric alcohol and one or more of the above carbonate compounds. Illustrative examples of the polyhydric alcohol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, diethylene glycol and 1,4-cyclohexanedimethanol.

Suitable polyether polyols include polyethylene glycol, polypropylene glycol, ethylene oxide/propylene oxide copolymers and polyoxytetramethylene glycol. Any one or combinations of two or more of these may be used.

The polyol compound serving as component (A) has a number-average molecular weight of preferably 1,000 to 5,000, and most preferably 1,500 to 3,000. A polyol compound having too small a number-average molecular weight may lower the physical properties of the resulting thermoplastic polyurethane resin film, such as the heat resistance and tensile elongation. On the other hand, too large a number-average molecular weight increases the viscosity during synthesis, which may lower the production stability of the thermoplastic polyurethane resin being prepared. The number-average molecular weights used here in connection with polyol compounds are calculated based on the hydroxyl values measured in accordance with JIS K1577.

Illustrative examples of the polyisocyanate compound serving as above component (B) include aromatic diisocyanates such as tolylene diisocyanate, 4,4'-diphenylmethane diisocyanate, p-phenylene diisocyanate, 1,5-naphthylene diisocyanate, 3,3'-dichloro-4,4'-diphenylmethane diisocyanate and xylylene diisocyanate; and aliphatic or alicyclic diisocyanates such as hexamethylene diisocyanate, isophorone diisocyanate, 4,4'-dicyclohexylmethane diisocyanate and hydrogenated xylylene diisocyanate.

The chain extender serving as above component (C) is preferably a low-molecular-weight compound having a molecular weight of not more than 300 and bearing two active hydrogen atoms capable of reacting with isocyanate groups.

Illustrative examples of such low-molecular-weight compounds include aliphatic diols such as ethylene glycol, diethylene glycol, propylene glycol, 1,3-propanediol, 1,4-butanediol, 1,5-pentanediol, 1,6-hexanediol, 1,7-heptanediol, 1,8-octanediol and 1,9-nonanediol; aromatic or alicyclic diols such as 1,4-bis(β-hydroxyethoxy)benzene, 1,4-cyclohexanediol, bis(β-hydroxyethyl) terephthalate and xylylene glycol; diamines such as hydrazine, ethylenediamine, hexamethylenediamine, propylenediamine, xylylenediamine, isophoronediamine, piperazine, piperazine derivatives, phenylenediamine and tolylenediamine; and amino alcohols such as adipoyl hydrazide and isophthaloyl hydrazide. Any one or combinations of two or more of these may be used.

In preparing a thermoplastic polyurethane resin for use in the invention, it is advantageous to react components (A) to (C) in the following proportions:

(A) 100 parts by weight of the polyol compound;
(B) 5 to 200 parts by weight, and preferably 20 to 100 parts by weight, of the polyisocyanate compound;
(C) 1 to 200 parts by weight, and preferably 5 to 100 parts by weight, of the chain extender.

The thermoplastic polyurethane resin is typically included in an amount of 0.5 to 30 wt %, and preferably 1 to 20 wt %, based on the overall electrode composition for electrical double-layer capacitors.

In the practice of the invention, the thermoplastic polyurethane resin has a swelling ratio, as determined from the formula indicated below, within a range of 150 to 800%, preferably 250 to 500%, and most preferably 250 to 400%. At too small a swelling ratio, the ionic conductivity of the ion-conductive composition becomes unacceptably low. On the other hand, at too large a swelling ratio, the resin, when swollen with electrolyte solution, bonds poorly with active material or carbonaceous material and has reduced adhesion to the surface of the current collector, as a result of which the electrode composition tends to separate from the current collector during assembly or during repeated charging and discharging.

In the invention, the specific method used to determine the swelling ratio involves first weighing a thermoplastic polyurethane resin film formed to a given size, then immersing the thermoplastic resin film in an electrolyte solution composed of the ion-conductive salt and solvent at 20° C. for 24 hours. The resin film is subsequently taken out of the electrolyte solution and placed between sheets of filter paper to remove solution adhering to the film surface. The resin film (ion-conductive composition) swollen with the electrolyte solution it has absorbed is then weighed. The results are used to calculate the swelling ratio as follows:

$$\text{swelling ratio (\%)} = \frac{\text{weight in grams of swollen ion-conductive composition after 24-hour immersion in electrolyte solution at } 20° \text{ C.}}{\text{weight in grams of thermoplastic resin before immersion in electrolyte solution}} \times 100$$

In the formula, "ion-conductive composition" refers to the thermoplastic resin after it has absorbed electrolyte solution and swelled. Thus, it is used here to mean a composition containing thermoplastic resin, ion-conductive salt, and a solvent in which the ion-conductive salt is soluble.

The amount of carbonaceous material included in the electrode composition for electrical double-layer capacitors of the invention is 500 to 10,000 parts by weight, and preferably 1,000 to 4,000 parts by weight, per 100 parts by weight of the binder polymer. The addition of too much carbonaceous material may lower the bond strength of the electrode composition, resulting in poor adhesion to the current collector. On the other hand, too little carbonaceous material may have the effect of increasing the electrical resistance, and thus lowering the capacitance, of the polarizable electrodes produced from the composition.

In addition to the binder polymer and the carbonaceous material described above, the electrode composition for electrical double-layer capacitors of the invention preferably includes also a conductive material.

The conductive material may be any suitable material capable of conferring electrical conductivity to the electrode composition for electrical double-layer capacitors of the invention. Illustrative examples include carbon black, Ketjen black, acetylene black, carbon whiskers, carbon fibers, natural graphite, artificial graphite, titanium oxide, ruthenium oxide, and metallic fibers such as aluminum and nickel. Any one or combinations of two or more thereof may be used. Of these, Ketjen black and acetylene black, which are both types of carbon black, are preferred. The average particle size of the conductive material powder is preferably 10 to 100 nm, and especially 20 to 40 nm.

The amount of conductive material included in the electrode composition is preferably 0 to 300 parts by weight, and especially 50 to 200 parts by weight, per 100 parts by weight of the binder polymer. The presence of too much conductive material in the composition reduces the proportion of the carbonaceous material, which may lower the capacitance of the polarizable electrodes obtained from the composition. On the other hand, the addition of too little conductive material may fail to confer adequate electrical conductivity.

The electrode composition for electrical double-layer capacitors of the invention is generally used together with a diluting solvent in the form of a paste. Suitable diluting solvents include N-methyl-2-pyrrolidone, acetonitrile, tetrahydrofuran, acetone, methyl ethyl ketone, 1,4-dioxane and ethylene glycol dimethyl ether. The diluting solvent is typically added in an amount of about 30 to 300 parts by weight per 100 parts by weight of the electrode composition.

No particular limitation is imposed on the method for shaping the polarizable electrode: as a thin film, although it is preferable to apply the composition by a suitable means such as roller coating with an applicator roll, screen coating, doctor blade coating, spin coating, bar coating or dip coating so as to form a carbonaceous material layer having a uniform thickness after drying of 10 to 500 $\mu$m, and especially 50 to 400 $\mu$m.

The resulting polar electrode for electrical double-layer capacitors of the invention has a density after drying of preferably 0.6 to 1.2 g/cm$^3$, more preferably 0.7 to 1.1 g/cm$^3$, even more preferably 0.8 to 1.1 g/cm$^3$, and most preferably 0.8 to 1.0 g/cm$^3$. A polarizable electrode density that is too low may lower the capacitance per unit volume of the electrode (F/cc). On the other hand, too high a density may impede ion mobility, resulting in an undesirably high electrode impedance.

The polarizable electrode of the invention has a spontaneous potential with respect to lithium metal which is much lower than ordinary, and preferably at most 3.0 V, more preferably at most 2.8 V, even more preferably at most 2.6 V, and most preferably not more than 2.3 V. In this way, there can be obtained an electrical double-layer capacitor having a large margin up to the potential at which decomposition of the electrolyte solution occurs, thus allowing a large voltage to be applied By subjecting the polarizable electrode of the invention to electrolytic activation in which it is passed through at least one charge/discharge cycle at a potential at least 30% higher, preferably at least 40% higher, and most preferably at least 50% higher than the rated potential (the potential at which the electrical double-layer capacitor is likely to be used), and specifically 3 to 5 V, the charge and discharge capacity becomes higher in the second and subsequent cycles.

In other words, it is preferable for the ratio between the capacitance $F_3$ of an electrical double-layer capacitor composed of a pair of the inventive polarizable electrodes prior to electrolytic activation and the capacitance $F_4$ of an electrical double-layer capacitor wherein one or both of the electrodes are polarizable electrodes according to the invention which have been electrolytically activated to satisfy the relationship $(F_4/F_3) \times 100 \geq 110\%$, and especially $(F_4/F_3) \times 100 \geq 130\%$.

<Electrical Double-Layer Capacitor of the Invention>

The electrical double-layer capacitor of the invention includes a pair of polarizable electrodes, a separator between the polarizable electrodes, and an electrolyte solution. One or both of the pair of polarizable electrodes, and preferably both, are polarizable electrodes for electrical double-layer capacitors according to the present invention as described above.

The separator between the pair of polarizable electrodes may be a material commonly used as a separator base in electrical double-layer capacitors. Illustrative examples include polyethylene nonwoven fabric, polypropylene nonwoven fabric, polyester nonwoven fabric, PTFE porous film, kraft paper, sheet laid from a blend of rayon fibers and sisal fibers, manila hemp sheet, glass fiber sheet, cellulose-based electrolytic paper, paper made from rayon fibers, paper made from a blend of cellulose and glass fibers, and combinations thereof in the form of multilayer sheets.

Alternatively, the polymer binder used in the above-described polarizable electrode for electrical double-layer capacitors may be formed into a film and used also as the separator. In such a case, because the separator has the same composition as the polymer binder in the electrode, the electrode-separator boundary can be integrally controlled, making it possible to further lower the internal resistance of the capacitor.

The electrolyte solution is preferably a nonaqueous electrolyte solution and contains an ion-conductive salt which may be any ion-conductive salt employed in conventional electrical double-layer capacitors. Preferred examples include salts obtained by combining a quaternary onium cation of the general formula $R^1R^2R^3R^4N^+$ or $R^1R^2R^3R^4P^+$ (wherein $R^1$ to $R^4$ are each independently alkyls of 1 to 10 carbons) with an anion such as $BF_4^-$, $N(CF_3SO_2)_2^-$, $PF_6^-$ or $ClO_4^-$.

Illustrative examples include $(C_2H_5)_3CH_3PBF_4$, $(C_2H_5)_4PBF_4$, $(C_3H_7)_4PBF_4$, $(C_4H_9)_4PBF_4$, $(C_6H_{13})_4PBF_4$, $(C_4H_9)_3CH_3PBF_4$, $(C_2H_5)_3(Ph-CH_2)PBF_4$ (wherein Ph stands for phenyl), $(C_2H_5)_4PPF_6$, $(C_2H_5)PCF_3SO_2$, $(C_2H_5)_4NBF_4$, $(C_4H_9)_4NBF_4$, $(C_6H_{13})_4NBF_4$, $(C_2H_5)_6NPF_6$, $LiBF_4$ and $LiCF_3SO_3$. These may be used alone or as combinations of two or more thereof.

Illustrative examples of the solvent in which the ion-conductive salt is soluble include chain ethers such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, and glycol ethers (e.g., ethyl cellosolve, ethyl carbitol, butyl cellosolve, butyl carbitol); heterocyclic ethers such as tetrahydrofuran, 2-methyltetrahy4rofuran, 1,3-dioxolane and 4,4-dimethyl-1,3-dioxane; butyrolactones such as γ-butyrolactone, γ-valerolactone, δ-valerolactone, 3-methyl-1,3-oxazolidin-2-one and 3-ethyl-1,3-oxazolidin-2-one; and other solvents commonly used in electrochemical devices, such as amide solvents (e.g., N-methylformamide, N,N-dimethylformamide, N-methylacetamide and N-methylpyrrolidinone), carbonate solvents (e.g., diethyl carbonate, dimethyl carbonate, ethylmethyl carbonate, propylene carbonate, ethylene carbonate, styrene carbonate), and imidazolidinone solvents (e.g., 1,3-dimethyl-2-imidazolidinone). These solvents may be used singly or as mixtures of two or more thereof.

In the electrolyte solution of the invention, the concentration of ion-conductive salt in the solvent is preferably 0.5 to 3.0 mol/L, and most preferably 0.7 to 2.2 mol/L.

Figure 2:
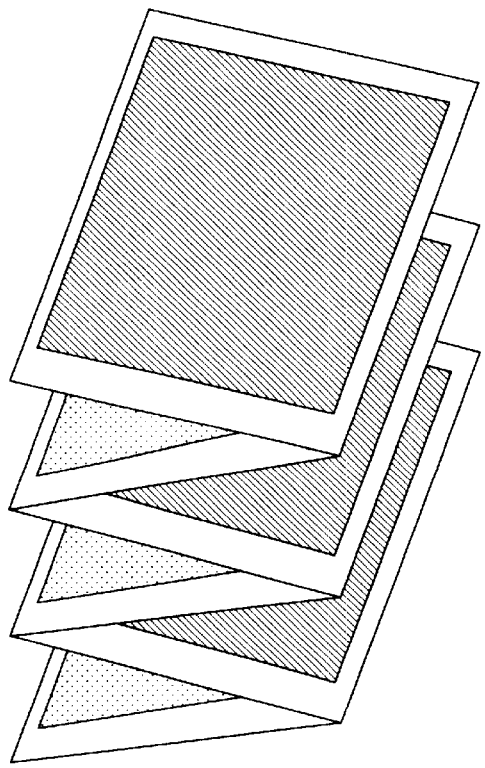
FIG. 2 is a perspective view of a fan-folded electrical double-layer capacitor.
Figure 3:
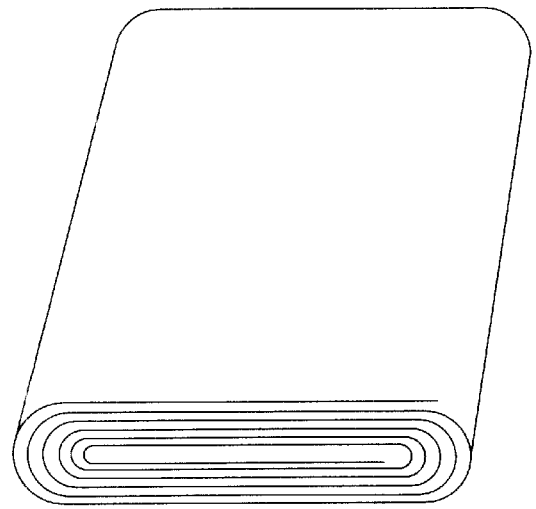
FIG. 3 is a perspective view of a coiled electrical double-layer capacitor.

The electrical double-layer capacitors according to the invention are assembled by stacking (see FIG. 1), fan-folding (FIG. 2) or winding (FIG. 3) an electrical double-layer capacitor assembly composed of a separator disposed between a pair of polarizable electrodes obtained as described above and placing the assembly in an aluminum laminate bag or a metal case, or by forming the electrical double-layer capacitor assembly into a coin-like shape (FIG. 4) and placing it in a capacitor housing such as a can or a laminate pack. The assembly is then filled with electrolyte composition, and the capacitor housing is mechanically sealed if it is a can or heat-sealed if it is a laminate pack.

The resulting electrical double-layer capacitor of the invention has a capacitance $F_1$ at a high current of 90 mA/cm$^2$ and a capacitance $F_2$ at a low current of 1.8 mA/cm$^2$, as measured by a constant current discharge method, such that the ratio $F_2/F_1$ is preferably from 1 to 4, more preferably from 1 to 2, and most preferably 1.

By subjecting the electrical double-layer capacitor of the invention to electrolytic activation in which it is passed through at least one charge/discharge cycle at a potential at least 30% higher, preferably at least 40% higher, and most preferably at least 50% higher than the rated potential (the potential at which the electrical double-layer capacitor is likely to be used), and specifically 3 to 5 V, the charge and discharge capacity becomes higher in the second and subsequent cycles.

That is, it is preferable for the ratio between the capacitance $F_3$ of the electrical double-layer capacitor before electrolytic activation and the capacitance $F_4$ of the electrical double-layer capacitor after electrolytic activation to satisfy the relationship $(F_4/F_3) \times 100 \geq 130\%$, and especially $(F_4/F_3) \times 100 \geq 150\%$.

Preferably, the electrical double-layer capacitor of the invention has a charge/discharge capacitance after 100 continuous charge/discharge cycles that is at least 95%, and especially from 95 to 100%, of the initial charge/discharge capacitance so that it does not undergo a decline in charge/discharge capacity even with repeated charging and discharging over an extended period of time.

The electrical double-layer capacitors of the invention are highly suitable for use in a broad range of applications, including memory backup power supplies for electronic equipment such as personal computers and wireless terminals, uninterruptible power supplies for computers and other equipment, in transport devices such as electric cars and hybrid cars, together with solar cells as energy storage systems for solar power generation, and in combination with batteries as load-leveling power supplies.

EXAMPLES

The following synthesis examples, examples of the invention and comparative examples are provided to illustrate the invention, and are not intended to limit the scope thereof.

Examples 1 to 3, Comparative Example 1
Carbonaceous Material

Mesophase pitch with a Mettler softening point of 285° C. prepared by the heat treatment of residual oil from the cracking of petroleum was melt-blow spun using a spinneret having a row of one thousand 0.2 mm diameter holes in a 2 mm wide slit, thereby producing pitch fibers.

The spun pitch fibers were drawn by suction against the back side of a belt made of 35 mesh stainless steel wire fabric and thereby collected on the belt. The resulting mat of pitch fibers was subjected to infusibilizing treatment in air at an average temperature rise rate of 4° C./min, yielding infusibilized fibers. The infusibilized fibers were then subjected to carbonization treatment in nitrogen at 700° C., following which they were milled to an average particle size of 25 μm in a high-speed rotary mill.

Next, 2 to 4 parts by weight of potassium hydroxide was added to and uniformly mixed with 1 part by weight of the milled carbon fibers, and alkali activation was carried out at 700° C. for 2 to 4 hours in a nitrogen atmosphere. The resulting reaction product was cooled to room temperature and placed in isopropyl alcohol, then washed with water to neutrality and dried.

The dried carbonaceous material was ground in a ball mill, thereby yielding three types of finely divided carbonaceous material having respective cumulative average particle sizes of 2.4 μm (Example 1), 1.5 μm (Example 2) and 19 μm (Example 3). The particle size distribution and cumulative average particle size of the carbonaceous materials were measured with a laser diffraction and scattering-type particle size distribution measuring apparatus (Microtrac HRA Model 9320-X100, manufactured by Nikkiso Co., Ltd.).

In Comparative Example 1, a phenol-type activated carbon (manufactured by Kansai Netsukagaku K.K. under the trade name MSP-20; cumulative average particle size, 7.5 μm) was used.

Table 1 shows the pore size distributions and BET specific surface areas measured for the carbonaceous materials prepared in Examples 1 to 3 and Comparative Example 1. In Example 3 and Comparative Example 1, in which 100% of the pores had a radius greater than 10 Å, the pore volume and pore volume ratio of pores having a radius of 20 to 400 Å were measured. The results are shown in Table 2.

<Pore Distribution of Carbonaceous Material>

The pore size distribution of carbonaceous material specimens was measured by the continuous flow method with a gas adsorption-desorption analyzer (Omnisorp 360, manufactured by Beckman Coulter, Inc.) using nitrogen gas after 8 hours of vacuum outgassing at 150° C. The volume (cc/g) of pores more than 10 Å was computed from a desorption isotherm obtained by BJH pore size analysis from a pore distribution plot. The volume (cc/g) of pores up to 10 Å in size was computed from an adsorption isotherm obtained by the MP procedure from an MP plot.

TABLE 1

|  |  | Example | | | Comparative |
| --- | --- | --- | --- | --- | --- |
|  |  | 1 | 2 | 3 | Example 1 |
| Pores larger than 10 Å | Volume (cc/g) | 0.07 | 0.05 | 0.07 | 0.13 |
|  | Volume ratio (%) | 70 | 83.3 | 70 | 11.3 |
| Pores up to 10 Å | Volume (cc/g) | 0.03 | 0.01 | 0.03 | 1.02 |
|  | Volume ratio (%) | 30 | 16.7 | 30 | 88.7 |
| Cumulative average particle size (μm) |  | 2.4 | 1.5 | 19 | 7.5 |
| BET specific surface area (m$^2$/g) |  | 90 | 52 | 79 | 1969 |

TABLE 2

|  | Example 3 | | Comparative Example 1 | |
| --- | --- | --- | --- | --- |
| Pore radius (Å) | Pore volume (cc/g) | Pore ratio (%) | Pore volume (cc/g) | Pore ratio (%) |
| At least 400, but less than 500 | 0.00067 | 0.99 | 0 | 0 |
| At least 300, but less than 400 | 0.00702 | 10.34 | 0.00481 | 3.57 |
| At least 200, but less than 300 | 0.00618 | 9.1 | 0.00191 | 1.42 |
| At least 100, but less than 200 | 0.01791 | 26.38 | 0.01483 | 11.02 |
| At least 50, but less than 100 | 0.01198 | 17.64 | 0.01313 | 9.75 |
| At least 40, but less than 50 | 0.00362 | 5.33 | 0.00538 | 4 |
| At least 30, but less than 40 | 0.00439 | 6.47 | 0.00874 | 6.49 |
| At least 20, but less than 30 | 0.00768 | 11.31 | 0.01763 | 13.1 |
| At least 10, but less than 20 | 0.00841 | 12.39 | 0.06817 | 50.64 |
| Less than 10 | — | — | — | — |

As is apparent from the results in Tables 1 and 2, the pitch-type carbonaceous materials in Examples 1 to 3 had small specific surface areas and pore size distributions containing few micron and submicron size pores. Accordingly, they were well-suited for use in polarizable electrodes for electrical double-layer capacitors.

Synthesis Example 1
Synthesis of Polyvinyl Alcohol Derivative

A reaction vessel equipped with a stirring element was charged with 10 parts by weight of polyvinyl alcohol (average degree of polymerization, 500; vinyl alcohol fraction, ≧98%) and 70 parts by weight of acetone. A solution of 1.81 parts by weight of sodium hydroxide in 2.5 parts by weight of water was gradually added under stirring, after which stirring was continued for one hour at room temperature.

To this solution was gradually added, over a period of 3 hours, a solution of 67 parts by weight of glycidol in 100 parts by weight of acetone. The resulting mixture was stirred for 8 hours at 50° C. to effect the reaction. Following reaction completion, stirring was stopped, whereupon the polymer precipitated from the mixture. The precipitate was collected, dissolved in 400 parts by weight of water, and neutralized with acetic acid. The neutralized polymer was purified by dialysis, and the resulting solution was freeze-dried, giving 22.50 parts by weight of dihydroxypropylated polyvinyl alcohol.

Three parts by weight of the resulting PVA polymer was mixed with 20 parts by weight of dioxane and 14 parts by weight of acrylonitrile. To this mixed solution was added a solution of 0.16 part by weight of sodium hydroxide in 1 part by weight of water, and stirring was carried out for 10 hours at 25° C.

The resulting mixture was neutralized using the ion-exchange resin produced by Organo Corporation under the trade name Amberlite IRC-76. The ion-exchange resin was separated off by filtration, after which 50 parts by weight of acetone was added to the solution and the insolubles were filtered off. The resulting acetone solution was placed in dialysis membrane tubing and dialyzed with running water. The polymer which precipitated within the dialysis membrane tubing was collected and re-dissolved in acetone. The resulting solution was filtered, following which the acetone was evaporated off, giving a cyanoethylated PVA polymer derivative.

The infrared absorption spectrum of this polymer derivative showed no hydroxyl group absorption, confirming that all the hydroxyl groups were capped with cyanoethyl groups (capping ratio, 100%).

Synthesis Example 2
Synthesis of Cellulose Derivative

Eight grams of hydroxypropyl cellulose (molar substitution, 4.65; product of Nippon Soda Co., Ltd.) was suspended in 400 ml of acrylonitrile, following which 1 ml of 4 wt % aqueous sodium hydroxide was added and the mixture was stirred 4 hours at 30° C.

The reaction mixture was then neutralized with acetic acid and poured into a large amount of methanol, giving cyanoethylated hydroxypropyl cellulose.

To remove the impurities, the cyanoethylated hydroxypropyl cellulose was dissolved in acetone, following which the solution was placed in a dialysis membrane tube and purified by dialysis using ion-exchanged water. The cyanoethylated hydroxypropyl cellulose which settled out during dialysis was collected and dried.

Elemental analysis of the resulting cyanoethylated hydroxypropyl cellulose indicated a nitrogen content of 7.3 wt %. Based on this value, the proportion of the hydroxyl groups on the hydroxypropyl cellulose that were capped with cyanoethyl groups was 94%.

Synthesis Example 3
Synthesis of Glycidol Derivative

A glycidol-containing flask was charged with methylene chloride to a glycidol concentration of 4.2 mol/L, and the reaction temperature was set at −10° C.

Trifluoroborate diethyl etherate ($BF_3 \cdot OEt_2$) was added as the catalyst (reaction initiator) to a concentration of $1.2 \times 10^{-2}$ mol/L, and the reaction was carried out by stirring for 3 hours under a stream of nitrogen. Following reaction completion, methanol was added to stop the reaction, after which the methanol and methylene chloride were removed by distillation in a vacuum.

The resulting crude polymer was dissolved in water and neutralized with sodium hydrogen carbonate, after which the solution was passed through a column packed with an ion-exchange resin (produced by Organo Corporation under the trade name Amberlite IRC-76). The eluate was passed through 5C filter paper, the resulting filtrate was distilled in vacuo, and the residue from distillation was dried.

The resulting purified polyglycidol was analyzed by gel permeation chromatography (GPC) using 0.1 M saline as the mobile phase, based upon which the polyethylene glycol equivalent weight-average molecular weight was found to be 6,250. Evaluation of the crystallinity by wide-angle x-ray diffraction analysis showed the polyglycidol to be amorphous. The polyglycidol was a soft, paste-like solid at room temperature.

Three parts by weight of the resulting polyglycidol was mixed with 20 parts of dioxane and 14 parts of acrylonitrile. To this mixed solution was added aqueous sodium hydroxide comprising 0.16 part of sodium hydroxide dissolved in 1 part by weight of water, and stirring was carried out for 10 hours at 25° C. to effect the reaction. Following reaction completion, 20 parts of water was added to the mixture, which was then neutralized using an ion-exchange resin (Amberlite IRC-76, produced by Organo Corporation). The ion-exchange resin was separated off by filtration, after which 50 parts by weight of acetone was added to the solution and the insolubles were filtered off. The filtrate was vacuum concentrated, yielding crude cyanoethylated polyglycidol.

The crude cyanoethylated polyglycidol was dissolved in acetone and the solution was filtered using 5A filter paper, then the polyglycidol was precipitated out of solution in water and the precipitate was collected. These two operations (dissolution in acetone and precipitation in water) were repeated twice, following which the product was dried in vacuo at 50° C., giving purified cyanoethylated polyglycidol.

The infrared absorption spectrum of the purified cyanoethylated polyglycidol showed no hydroxyl group absorption, indicating that all the hydroxyl groups had been substituted with cyanoethyl groups. Wide-angle x-ray diffraction analysis to determine the crystallinity showed that the product was amorphous at room temperature. The polyglycidol was a soft, paste-like solid at room temperature.

Synthesis Example 4
Thermoplastic Polyurethane Resin

A reactor equipped with a stirrer, a thermometer and a condenser was charged with 64.34 parts by weight of preheated and dehydrated polycaprolactone diol (Praccel 220N, made by Daicel Chemical Industries, Ltd.) and 28.57 parts by weight of 4,4'-diphenylmethane diisocyanate. The reactor contents were stirred and mixed for 2 hours at 120° C. under a stream of nitrogen, following which 7.09 parts by weight of 1,4-butanediol was added to the mixture and the reaction was similarly effected at 120° C. under a stream of nitrogen. When the reaction reached the point where the reaction product became rubbery, it was stopped. The reaction product was then removed from the reactor and heated at 100° C. for 12 hours. Once the isocyanate peak was confirmed to have disappeared from the infrared red absorption spectrum, heating was stopped, yielding a solid polyurethane resin.

The resulting polyurethane resin had a weight-average molecular weight (Mw) of $1.71 \times 10^5$. The polyurethane resin, when immersed for 24 hours at 20° C. in an electrolyte solution prepared by dissolving 1 mole of $LiClO_4$ as the supporting salt in 1 liter of a mixed solvent composed of ethylene carbonate and diethyl carbonate in a 1:1 volumetric ratio, had a swelling ratio of 320%.

Example 4
Polarizable Electrode for Electrical Double-Layer Capacitor (1)

A binder resin was prepared by adding 0.2 part by weight of polyethylene glycol dimethacrylate (number of oxyethylene units=9) and 0.2 part by weight of methoxypolyethylene glycol monomethacrylate (number of oxyethylene units=9) to 1 part by weight of the polyvinyl alcohol derivative prepared in Synthesis Example 1, and mixing.

The resulting binder resin, the carbonaceous material of Example 1, acetylene black as the conductive material and N-methyl-2-pyrrolidone as the diluting solvent were mixed in a weight ratio (carbonaceous material of Example 1/acetylene black/binder resin/N-methyl-2-pyrrolidone) of 20:1:1:30 to form an electrode composition for electrical double-layer capacitors.

The resulting electrode composition was cast onto an aluminum current collector using a doctor knife applicator, then heated at 80° C. for 2 hours to evaporate off the N-methyl-2-pyrrolidone, thereby giving a polar electrode.

Example 5
Polarizable Electrode for Electrical Double-Layer Capacitor (2)

A binder resin was prepared by adding 0.2 part by weight of polyethylene glycol dimethacrylate (number of oxyethylene units=9) and 0.2 part by weight of methoxypolyethylene glycol monomethacrylate (number of oxyethylene units=9) to 1 part by weight of the cellulose derivative prepared in Synthesis Example 2, and mixing.

The resulting binder resin, the carbonaceous material of Example 1, acetylene black as the conductive material and N-methyl-2-pyrrolidone as the diluting solvent were mixed in a weight ratio (carbonaceous material of Example 1/acetylene black/binder resin/N-methyl-2-pyrrolidone) of 20:1:1:30 to form an electrode composition for electrical double-layer capacitors.

The resulting electrode composition was cast onto an aluminum current collector using a doctor knife applicator, then heated at 80° C. for 2 hours to evaporate off the N-methyl-2-pyrrolidone, thereby giving a polar electrode.

Example 6
Polarizable Electrode for Electrical Double-Layer Capacitor (3)

A binder resin was prepared by adding 0.2 part by weight of polyethylene glycol dimethacrylate (number of oxyethylene units=9) and 0.2 part by weight of methoxypolyethylene glycol monomethacrylate (number of oxyethylene units=9) to 1 part by weight of the polyvinyl alcohol derivative prepared in Synthesis Example 3, and mixing.

The resulting binder resin., the carbonaceous material of Example 1, acetylene black as the conductive material and N-methyl-2-pyrrolidone as the diluting solvent were mixed in a weight ratio (carbonaceous material of Example 1/acetylene black/binder resin/N-methyl-2-pyrrolidone) of 20:1:1:30 to form an electrode composition for electrical double-layer capacitors.

The resulting electrode composition was cast onto an aluminum current collector using a doctor knife applicator, then heated at 80° C. for 2 hours to evaporate off the N-methyl-2-pyrrolidone, thereby giving a polar electrode.

Examples 7 to 11, Comparative Example 2
Polarizable Electrodes for Electrical Double-Layer Capacitors (4 to 8)

Carbonaceous materials, polymer binders and conductive materials in the combinations shown in Table 3 for Examples 7 to 11 and Comparative Example 2 were stirred and mixed to form paste-like electrode compositions for electrical double-layer capacitors. Each of the resulting electrode compositions was coated onto aluminum foil to a dry film thickness of 200 μm using a doctor blade, then heated at 80° C. for 2 hours, thereby giving polar electrodes for each of the examples.

TABLE 3

| Components (pbw) | EX 7 | EX 8 | EX 9 | EX 10 | EX 11 | CE 2 |
| --- | --- | --- | --- | --- | --- | --- |
| Carbonaceous material | EX 1 | EX 2 | EX 3 | EX 1 | EX 1 | CE 1 |
|  | 100 | 100 | 100 | 100 | 100 | 100 |
| Polymer binder | Syn. Ex. 4 | Syn. Ex. 4 | Syn. Ex. 4 | Syn. Ex. 4 | PVDF[1] | Syn. Ex. 4 |
|  | 5 | 5 | 5 | 5 | 5 | 5 |
| Conductive material[2] | 5 | 5 | 5 | — | 5 | 5 |

[1]PVDF (supplied by Aldrich Chemical Co., Ltd.; weight-average molecular weight, 534,000)
[2]Acetylene black The polarizable electrodes produced in Examples 4 to 11 and Comparative Example 2 were measured as described below to determine their electrode density, spontaneous potential with respect to lithium metal, and capacitance. The results are shown in Table 4.

<Electrode Density>

After the polarizable electrodes were fabricated, disk-shaped specimens were punched from the electrodes and used to measure thickness (T1, in cm), surface area (S, in cm$^2$) and electrode weight (W1, in g). Specimens of the current collectors punched to the same surface area were similarly measured for thickness (T2, in cm) and weight (W2, in g). These measurements were used to compute the electrode density as follows.

$$\text{Electrode density (g/cm}^3) = \frac{[W1 \text{ (g)} - W2 \text{ (g)}]}{[T1 \text{ (cm)} - T2 \text{ (cm)}] \times S \text{ (cm}^2)}$$

<Spontaneous Potential With Respect to Lithium Metal>

Using the polarizable electrode fabricated above as the working electrode, and lithium metal as the counter electrode, the voltage of the working electrode with respect to the counter electrode was measured. Voltage measurements were carried out with a HA-501 potentiostat manufactured by Hokuto Denko Corporation.

<Capacitance>

An electrical double-layer capacitor was assembled by the same method as in Example 12 below using the polarizable electrodes fabricated above. Using a charge-discharge tester (HJ1005SM8, manufactured by Hokuto Denko Corporation), the resulting capacitor was subjected to a charge-discharge test in which it was charged to an upper limit voltage of 2.5 V, discharged to an end voltage of 0 V, and the current density was set at 1.5 mA/cm$^2$. The capacitance was computed from the integrated value of the electrical energy at discharge.

current discharge method, of 3.4. In addition, the capacitor was subjected to a 100-cycle charge/discharge test conducted at a constant current in which the upper limit voltage during charging was set at 2.5 V, discharge was carried out to a final voltage of 0 V, and the current density was 1.5 mA/cm$^2$. The ratio of the charge-discharge capacity after 100 cycles to the initial charge-discharge capacity was 97%.

The electrical double-layer capacitor of Example 12 also had a ratio between the capacitance $F_4$ after carrying out a single charge-discharge cycle at a potential (3.5 V) at least 30% higher than the rated potential (electrolytic activation) and the capacitance $F_3$ before carrying out such electrolytic activation (($F_4/F_3$)×100) of 132%. This demonstrated that carrying out electrolytic activation at a potential higher than the rated potential increases the charge-discharge capacity.

Comparative Example 3

Electrical Double-Layer Capacitor (2)

Figure 4:
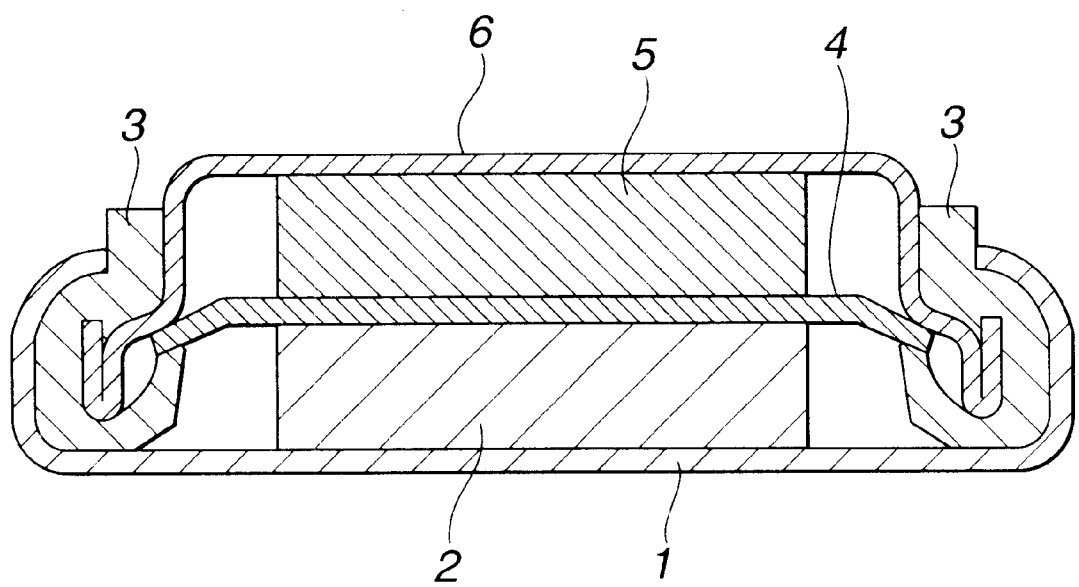
FIG. 4 is a sectional view of a coin-type electrical double-layer capacitor of the type produced in the examples described later in the specification.

Aside from using the polarizing electrodes prepared in Comparative Example 2, a coin-type electrical double-layer capacitor like that shown in FIG. 4 was fabricated in the same way as in Example 12.

The coin-type electrical double-layer capacitor of Comparative Example 3 had an $F_2/F_1$ ratio between the capacitance $F_1$ at a high current of 90 mA/cm$^2$ and the capacitance $F_2$ at a low current of 1.8 mA/cm$^2$, as measured by a constant current discharge method, of 4.6. In addition, the capacitor was subjected to a 100-cycle charge/discharge test conducted at a constant current in which the upper limit voltage during charging was set at 2.5 V, discharge was carried out to a final voltage of 0 V, and the current density was 1.5 mA/cm$^2$. The ratio of the charge-discharge capacity after 100 cycles to the initial charge-discharge capacity was 92%.

TABLE 4

| | Example | | | | | | | | |
|---|---|---|---|---|---|---|---|---|---|
| | 4 | 5 | 6 | 7 | 8 | 9 | 10 | 11 | CE2 |
| Electrode density (g/cm$^3$) | 0.72 | 0.78 | 0.75 | 0.72 | 0.92 | 0.6 | 0.7 | 0.75 | 0.45 |
| Spontaneous potential (V) | 2.3 | 2.3 | 2.2 | 2.3 | 2.6 | 2.4 | 2.3 | 2.3 | 3.0 |
| Capacitance (F/cc) | 13.8 | 13.0 | 13.7 | 15.3 | 14.0 | 8.8 | 10.8 | 15.7 | 14.9 |

As is apparent from Table 4, the polarizing electrodes of Examples 4 to 11 produced using the pitch-type carbonaceous material of Examples 1 to 3 had a low spontaneous potential with respect to lithium metal and a high capacitance per unit volume. Moreover, reducing the cumulative average particle size by grinding further increased the electrode density, and in turn the capacitance.

Example 12

Electrical Double-Layer Capacitor (1)

A separator was formed by impregnating a separator base (polytetrafluoroethylene) with an electrolyte solution prepared by dissolving 2 moles of triethylmethylammonium tetrafluoroborate as the supporting salt in 1 liter of propylene carbonate. The separator was placed between a pair of the polarizing electrodes fabricated in Example 8, following which the resulting capacitor assembly was filled with the electrolyte solution, giving a coil-type electrical double-layer capacitor like that shown in FIG. 4.

The coin-type electrical double-layer capacitor of Example 12 had an $F_2/F_1$ ratio between the capacitance $F_1$ at a high current of 90 mA/cm$^2$ and the capacitance $F_2$ at a low current of 1.8 mA/cm$^2$, as measured by a constant The electrical double-layer capacitor of Comparative Example 3 also had a ratio between the capacitance $F_4$ after carrying out a single charge-discharge cycle at a potential (3.5 V) at least 30% higher than the rated potential (electrolytic activation) and the capacitance $F_3$ before carrying out such electrolytic activation (($F_4/F_3$)×100) of 98%.

As described above and demonstrated in the foregoing examples, the invention provides carbonaceous materials having a pore size distribution and a small specific surface area optimized for the penetration of a non-aqueous electrolyte solution to the interior thereof and the surface adsorption of ionic molecules so as to form an electrical double layer thereon. The invention also provides electrical double-layer capacitors which can be assembled using polarizable electrodes made with such carbonaceous materials, and which have a high voltage, a high energy density, a high capacitance, a long cycle life, and are amenable to miniaturization.

What is claimed is:

1. A carbonaceous material having a pore size distribution, as determined from a nitrogen adsorption isotherm, in which pores with a radius of up to 10 Å account for at most 70% of the total pore volume, and having a specific surface area, as measured by the nitrogen adsorption BET method, of 1 to 200 m²/g.

2. The carbonaceous material of claim 1 having a pore size distribution, as determined from a nitrogen adsorption isotherm, in which at least 50% of the pores with a radius greater than 10 Å having a pore radius of 20 to 400 Å.

3. The carbonaceous material of claim 1, which is prepared by subjecting a mesophase pitch-based carbon material, a polyacrylonitrile-based carbon material, a gas phase-grown carbon material, a rayon-based carbon material or a pitch-based carbon material to alkali activation with an alkali metal compound, then grinding the activated carbon material.

4. The carbonaceous material of claim 3 which is in the form of fine particles having a cumulative average particle size after grinding of at most 20 μm.

5. The carbonaceous material of claim 3 or 4 which is prepared by subjecting mesophase pitch-type carbon fibers to alkali activation, then grinding the activated fibers, and which is in the form of fine particles having a cumulative average particle size of at most 5 μm.

6. A polarizable electrode for electrical double-layer capacitors that is made by coating a current collector with an electrode composition containing a carbonaceous material according to claim 1 and a polymer binder, drying the applied coat, and press-forming; which polarizable electrode has a density after drying of 0.6 to 1.2g/cm³.

7. A polarizable electrode for electrical double-layer capacitors that is made by coating a current collector with an electrode composition containing a carbonaceous material according to claim 1, a polymer binder and a conductive material, drying the applied coat, and press-forming; which polarizable electrode has a density after 0.6 to 1.2 g/cm³.

8. The polarizable electrode of claim 6 or 7 which has a spontaneous potential with respect to lithium metal of at most 3.0 V.

9. The polarizable electrode of claim 6, wherein the polymer binder is a polymeric material having an interpenetrating network structure or a semi-interpenetrating network structure.

10. The polarizable electrode of claim 6, wherein the polymer binder is a fluoropolymer material.

11. The polarizable electrode of claim 6, wherein the polymer binder is a thermoplastic polyurethane-type polymeric material.

12. The polarizable electrode of claim 6 which is activated by carrying out at least one charge/discharge cycle at a potential at least 30% higher than the rated potential.

13. An electrical double-layer capacitor comprising:
a pair of polarizable electrodes,
a separator between the polarizable electrodes, and
an electrolyte solution;
wherein one or both of the pair of polarizable electrodes is a polarizable electrode according to claim 6.

14. The electrical double-layer capacitor of claim 13, wherein the electrolyte solution is a non-aqueous electrolyte solution.

15. The electrical double-layer capacitor of claim 13 or 14 which has a capacitance $F_1$ at a high current of 90 mA/cm² and a capacitance $F_2$ at a low current of 1.8 mA/cm², as measured by a constant current discharge method, such that the ratio $F_2/F_1$ is from 1 to 4.

16. An electrical double-layer capacitor comprising:
a pair of polarizable electrodes,
a separator between the polarizable electrodes, and
an electrolyte solution;
wherein the pair of polarizable electrodes are polarizable electrodes according to claim 6, and are activated by carrying out at least one charge/discharge cycle at a potential at least 30% higher than the rated potential.

* * * * *